United States Patent
Nakagawa et al.

(10) Patent No.: US 6,333,949 B1
(45) Date of Patent: Dec. 25, 2001

(54) VIDEO CODING APPARATUS AND DECODING APPARATUS

(75) Inventors: Akira Nakagawa; Kimihiko Kazui; Eishi Morimatsu, all of Kawasaki; Takahiro Shimizu, Yokohama, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/474,133

(22) Filed: Dec. 29, 1999

Related U.S. Application Data

(62) Division of application No. 08/877,508, filed on Jun. 17, 1997, now Pat. No. 6,104,436.

(30) Foreign Application Priority Data

Oct. 24, 1996 (JP) .................................................. 8-281984
Nov. 7, 1996 (JP) .................................................. 8-294753

(51) Int. Cl.[7] ...................................................... H04N 7/36
(52) U.S. Cl. ............................... 375/240.16; 375/240.03; 375/240.04; 375/240.12; 375/240.24; 375/240.25
(58) Field of Search .............................. 348/403.1, 413.1, 348/416.1, 409.1; 375/240.25, 240.16, 240.12, 240.21, 240.24, 240.03, 240.04; H04N 7/36

(56) References Cited

U.S. PATENT DOCUMENTS 5,123,841   6/1992   Tanaka et al. .................. 375/240.16
5,543,848 * 8/1996   Murakami et al. ............... 348/416.1

(List continued on next page.)

FOREIGN PATENT DOCUMENTS

0603878A2   6/1994   (EP) .
0838955A3   4/1998   (EP) .

(List continued on next page.)

OTHER PUBLICATIONS

Huifang Sun, "Hierarchical Decoder for MPEG Compressed Video Data", IEEE Transactions on Consumer Electronics, vol. 39, No. 3, Aug. 1, 1993, pp. 559–564, Sections 1–3.

*Primary Examiner*—Howard Britton
(74) *Attorney, Agent, or Firm*—Staas & Halsey LLP

(57) ABSTRACT

Video coding apparatus and decoding apparatus capable of reproducing decoded pictures without introducing unwanted noises, even if any considerable difference in pixel values or discontinuity exists at a certain block boundary. In a video coding apparatus employing predictive techniques, a dequantizer and an inverse DCT processor reproduce a prediction error signal from quantized transform coefficients. Here, a first resolution conversion unit (or downsampling unit) might have subsampled the original prediction error signal to reduce its picture resolution. If this is the case, a second resolution conversion unit (or upsampling unit) attempts to restore the original resolution of the prediction error signal by applying an upsampling process to the reproduced prediction error signal having the reduced resolution. In this upsampling process, each new pixel value in a certain block are calculated with reference to some surrounding pixels. The upsampling process, however, will not refer to the pixels belonging to any adjacent blocks that are subject to another coding scheme which is different from the coding scheme of the present block of interest. As an alternate arrangement, the upsampling process will entirely neglect the pixels in any other blocks but will refer only to the present block, block-by-block basis, comprising the substep of (b1) performing an upsampling process of each block with the low resolution to regain the high resolution, while not referring, when calculating a pixel value in a block that is subject to one of the coding schemes, to any pixels that belong to any other block adjacent to the block of interest if the adjacent block is subject to the other coding scheme, but referring at least to the pixels belonging to the block of interest.

9 Claims, 17 Drawing Sheets

U.S. PATENT DOCUMENTS

| | | | |
|---|---|---|---|
| 5,579,051 | * 11/1996 | Murakami et al. | 348/409.1 |
| 5,581,302 | * 12/1996 | Ran et al. | 375/240.16 |
| 5,644,361 | * 7/1997 | Ran et al. | 375/240.16 |
| 5,724,098 | * 3/1998 | Murakami et al. | 348/416.1 |
| 6,104,434 | * 8/2000 | Nakagawa et al. | 375/240.16 |

FOREIGN PATENT DOCUMENTS

| | | |
|---|---|---|
| 63-155896 | 6/1988 | (JP) . |
| 07-095566 | 4/1995 | (JP) . |
| WO 96/17478 | 6/1996 | (WO) . |

* cited by examiner

INTRAFRAME / INTERFRAME
BLOCK BOUNDARY $h^* = (9a+9b+9g+9h+3c+3d+3i+3j+3m+3n+3s+3t)/64$ $i^* = (3a+3b+3g+3h+9c+9d+9i+9j+m+n+s+t)/64$ $j^* = (9c+9d+9i+9j+3e+3f+3k+3l)/64$ $k^* = (3c+3d+3i+3j+9e+9f+9k+9l)/64$ $n^* = (3a+3b+3g+3h+c+d+i+j+9m+9n+9s+9t)/64$ $o^* = (a+b+g+h+3c+3d+3i+3j+3m+3n+3s+3t)/64$ $p^* = (3c+3d+3i+3j+e+f+k+l)/64$ $q^* = (c+d+i+j+3e+3f+3k+3l)/64$

⋮  ⋮  ⋮  ⋮  ⋮  ⋮

$A = (a+b+g+h)/4$ $B = (c+d+i+j)/4$ $C = (e+f+k+l)/4$ $D = (m+n+s+t)/4$ $E = (o+p+u+v)/4$ $F = (q+r+w+x)/4$ $h* = (9A+3B+3D+E)/16$ $i* = (3A+9B+D+3E)/16$ $j* = (9B+3C+3E+F)/16$ $k* = (3B+9C+E+3F)/16$ $n* = (3A+B+9D+3E)/16$ $o* = (A+3B+3D+9E)/16$ $p* = (3B+C+9E+3F)/16$ $q* = (B+3C+3E+9F)/16$

: : : :

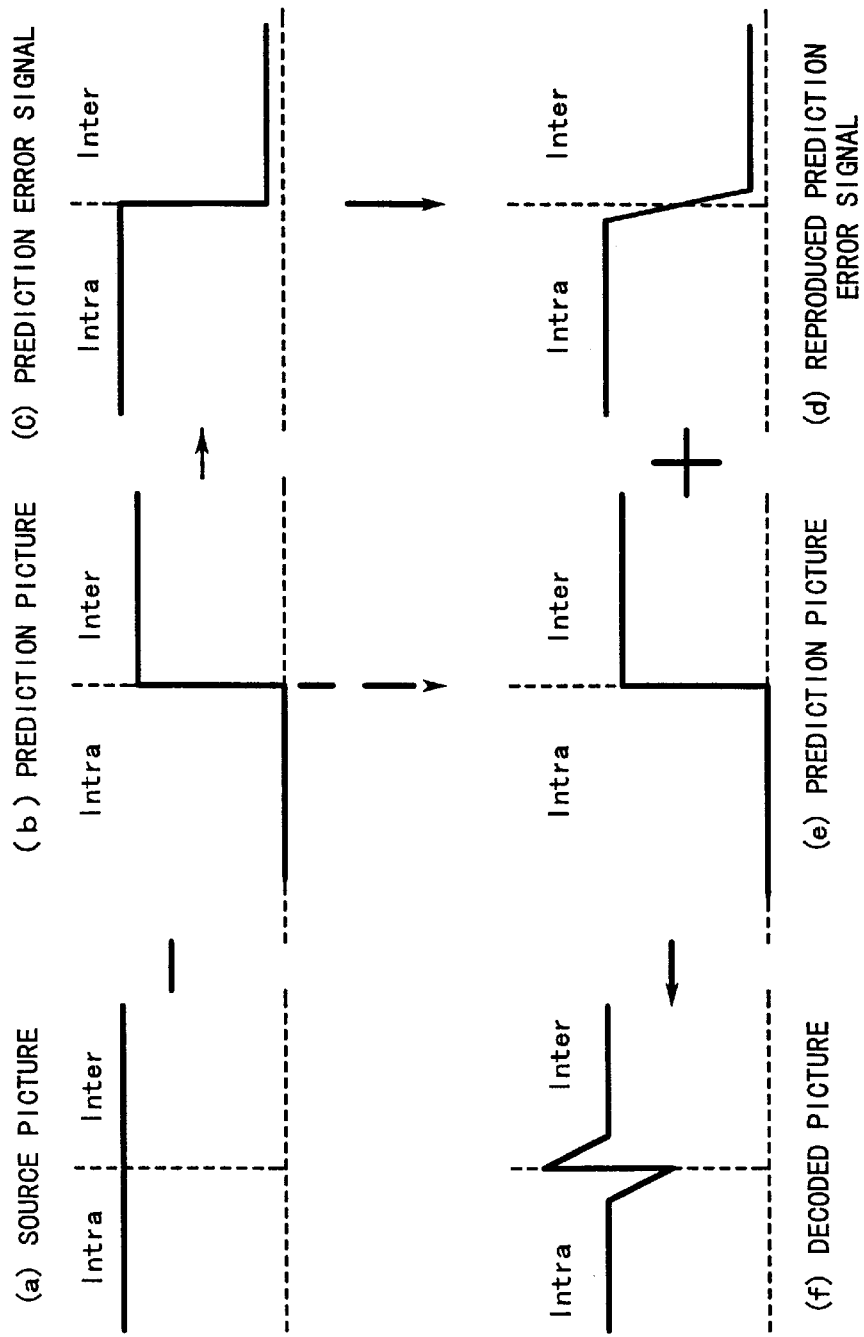

VIDEO CODING APPARATUS AND DECODING APPARATUS

This application is a divisional of application Ser. No. 08/877,508, filed Jun. 17, 1997, now allowed.

BACKGROUND OF THE INVENTION

1. Field of the Invention

The present invention relates to video coding apparatus and video decoding apparatus, and more particularly, to a video coding apparatus that performs predictive coding of digital video signals and a video decoding apparatus that reproduces the original motion images from the predictive-coded video signal produced by the video coding apparatus.

2. Description of the Related Art

The ITU-T standard H.261 and the ISO standards MPEG-1 and MPEG-2, for example, are well-acknowledged international standards for motion picture coding techniques. Those standards use hybrid coding algorithms, where the coding process will proceed as follows: (1) a source picture is divided into blocks of pixels, (2) orthogonal transformation (e.g., discrete cosine transform) and motion compensation are applied independently on each block, and (3) quantized video data is compressed by entropy coding.

When a motion of considerable magnitude or a full scene transition happened in the middle of a sequence of video frames, the above-described hybrid video coding techniques may suffer from an overwhelming amount of coded frame data that exceeds a certain standard level allowed for each frame. In this case, the coder will forcibly reduce the amount of coded data in an attempt to regulate it at the standard level. This will cause extreme degradation in image quality and coarse frame subsampling (or a drop in frame update rates), thus resulting in unacceptably poor pictures when reconstructed at the receiving ends.

A video coding system aiming at avoidance of the above problem is proposed in Japanese Patent Application No. 8-75605 (1996), for instance, by the same applicant of the present invention. In this proposed system, the video coding apparatus reduces the resolution of input frame signals to regulate the amount of coded frame data when a full scene transition or a massive motion has happened in the middle of a sequence of video frames.

FIG. 14 is a block diagram of this video coding apparatus proposed in the Japanese Patent Application No. 8-75605. The apparatus of FIG. 14 supports two kinds of picture resolutions: Common Intermediate Format (CIF, 352×288 pixels) and quarter-CIF (QCIF, 176×144 pixels). A CIF/QCIF selection controller 125 determines which picture resolution should be used to encode source pictures, considering the amount of coded frame data produced in a predictive coding, quantizer step size, and some other parameters. For example, the CIF/QCIF selection controller 125 normally chooses the high resolution CIF, while it chooses the low resolution QCIF when a large amount of data has been produced as a result of the coding.

A frame memory 122 is used to store reconstructed (or decoded) pictures of the previous frames. Comparing the source picture of the current frame with a decoded picture that is retrieved from the frame memory 122 as the reference picture, a prediction parameter calculation unit 112 computes motion vectors of the current frame. Here, a picture is partitioned into a plurality of blocks and the comparison of frame data is performed on a block-by-block basis. Each source frame picture is subjected to either an intraframe coding or an interframe coding. A prediction parameter calculation unit 112 determines which coding scheme should be applied to the source frame picture. When the interframe coding is activated, a prediction picture generation unit 113 produces a prediction picture of the current frame based on the decoded image of the previous frame and the motion vectors calculated by the prediction parameter calculation unit 112.

A prediction error signal generation unit 114 produces a prediction error signal by calculating differences between the source picture and the prediction picture on a block-by-block basis. A CIF/QCIF converter 131 changes the resolution of this prediction error signal, which is originally CIF, to what is chosen by the CIF/QCIF selection controller 125. More specifically, the CIF/QCIF converter 131 outputs the prediction error signal as it is when the CIF resolution is selected by the CIF/QCIF selection controller 125, and it in turn converts the resolution to QCIF when the QCIF resolution is selected.

A coding controller 124 receives information regarding the amount of the resultant coded data from an entropy coding unit 117 (described later), as well as obtaining information on buffer occupancy from a coded data buffer 118 (described later). Based on such information, the coding controller 124 determines the quantizer step size and distributes it to a quantizer 116, a dequantizer 119, the CIF/QCIF selection controller 125, and the entropy coder 117.

A DCT processor 115 applies an orthogonal transform, or a digital cosine transform (DCT), to the output of the CIF/QCIF converter 131, and a quantizer 116 quantizes the obtained DCT coefficients in accordance with the quantizer step size specified by the coding controller 124.

The entropy coder 117 receives the quantized DCT coefficients from the quantizer 116, the picture resolution from the CIF/QCIF selection controller 125, and the motion vectors and coding scheme information from the prediction parameter calculation unit 112. Entropy coding is a data compression process that assigns shorter code words to frequent events and longer code words to less frequent events. Out of a predefined code word table, the entropy coder 117 retrieves code words relevant to each combination of the above received data, thereby outputting the coded frame data.

The quantized DCT coefficients produced by the quantizer 116 are also supplied to the dequantizer 119 for inverse quantization, or dequantization. The resultant output signals are then subjected to an inverse discrete cosine transform (IDCT) process that is executed by an IDCT processor 120 to reproduce the original prediction error signal. When the reproduced prediction error signal has the QCIF format as a result of the resolution reduction by the CIF/QCIF converter 131, a QCIF/CIF converter 132 reconverts it to regain the original CIF resolution. A decoded picture generator 121 reconstructs a picture by adding the prediction error signal outputted by the QCIF/CIF converter 132 to the prediction picture produced by the prediction picture generator 113. This fully decoded picture is then transferred to a frame memory 122 for storage.

As described above, the proposed video coding apparatus monitors the amount of coded frame data and the like, and if any significant increase is expected in the amount of coded frame data, the apparatus will reduce the resolution of the prediction error signal from CIF to QCIF.

The CIF/QCIF converter 131 performs such resolution reduction through a downsampling process as exemplified in FIG. 15. More specifically, white dots in FIG. 15 represent CIF pixels and lower-case alphabetic characters placed in them indicate their respective prediction error signal values. Black dots represent QCIF pixels, and upper-case letters beside them signify their respective prediction error signal values. The downsampling process calculates the QCIF prediction error signal values A, B, C, and D by averaging four values of the CIF pixels surrounding each of the QCIF pixels. For example, the pixel value A is obtained as $$A=(a+b+e+f)/4. \qquad (1)$$

In contrast to that, the QCIF/CIF converter 132 performs a QCIF-to-CIF resolution conversion through an upsampling process as shown in FIG. 16. More specifically, black dots represent QCIF pixels, and upper-case letters beside them indicate their respective prediction error signal values, while white dots represent CIF pixels and lower-case letters in them indicate their respective prediction error signal values. To obtain the CIF prediction error signal values a, b, c, and so on, the upsampling process calculates a weighted average value of four QCIF pixels surrounding each CIF pixel. For example, the pixel value f is obtained as $$f=(9A+3B+3C+D)/16, \qquad (2)$$

where four QCIF values are summed up with weighting coefficients determined in accordance with their respective distances from the pixel 134 of interest.

It should be noted here that the above-described conventional video coding apparatus is constructed on the assumption that all blocks in a frame are encoded by using a consistent coding scheme. More specifically, it is assumed that every block in a given frame is subjected to either an intraframe coding or an interframe coding, but this coding scheme cannot be switched in the middle of the frame.

In reality, however, the two different coding schemes can sometimes be applied to different blocks in the same frame. If this is the case, some adjacent blocks within the same frame will be coded in different ways. Take the pixel map illustrated in FIG. 16 for example. Here, a dashed line 133 represents a block boundary where the applied coding scheme changes from interframe coding to intraframe coding or vise versa. To calculate a prediction error signal value f at a CIF pixel 134, the QCIF/CIF converter 132 uses the equation $$f=(9A+3B+3C+D)/16, \qquad (3)$$

where the QCIF pixel values C and D subject to the different coding scheme will affect the result f. Referring now to FIG. 17, problems caused by this mixed pixel reference will be discussed below.

FIG. 17 schematically shows a process of the predictive coding and decoding of a source picture. FIG. 17 consists of six graphs, (a) to (f), each of which represents how the pixel values will vary when scanning across some different blocks. In other words, these graphs show the profiles of pixel values in the neighborhood of a certain block boundary. More specifically, the left half of each profile (labeled "Intra") is a block subject to the intraframe coding, while the right half (labeled "Inter") is a block subject to the interframe coding, where the vertical dashed line indicates the block boundary. The upper-left graph (a) shows the profile of a source picture, in which the pixel values are just flat in both blocks. Since the left block is subjected to the intraframe coding and thus has no reference frame for prediction, its pixel values in the prediction picture profile (b) will be zeros. Accordingly, the resultant prediction error signal (c) exhibits large difference values in the left block, while showing small values in the right block that is subject to the interframe coding. Incidentally, in FIG. 17 (and also in later figures), the big "+" and "−" signs imply subtraction and addition of pictures, respectively.

In such a situation where two adjacent blocks are coded with different schemes (i.e., intraframe and interframe), the upsampling operations executed by the QCIF/CIF converter 132 as noted earlier will introduce a mixture of differently coded pixel values in the vicinity of the block boundary. That is, the reproduced prediction error signal will be deformed as illustrated in a profile (d) of FIG. 17, as a result of the upsampling operations by the QCIF/CIF converter 132. Then the summation of this reproduced prediction error signal (d) and a prediction picture (e), which equals the prediction picture (b), provided from the prediction picture generation unit 113 will yield a decoded picture (f). As illustrated in FIG. 17, the resultant decoded picture (f) contains some distortion in the vicinity of the block boundary. Fidelity of decoded pictures to the original pictures is one of the important design considerations in video decoders. As opposed to this, the picture (f) reconstructed by the conventional video coding apparatus is different from the original source picture (a).

This kind of problem may occur not only in the particular situation in which two different coding schemes are applied to adjacent blocks in a frame, but it can potentially happen to any video i frames that contain some sharp edges exhibiting a large difference or discontinuity in pixel values at a certain block boundary in a single frame. Such discontinuous transitions of pixel values may also be observed in such video frames where two neighboring blocks have quite different motion vectors. When decoded, the picture will suffer from similar noises, or artifacts, produced in the vicinity of the boundary of those neighboring blocks.

SUMMARY OF THE INVENTION

Taking the above into consideration, an object of the present invention is to provide a video coding apparatus and a video decoding apparatus which can reproduce decoded pictures without introducing unwanted noises, even if any considerable difference in pixel values or discontinuity exists at a certain block boundary.

To accomplish the above object, according to the present invention, there is provided a video coding apparatus for performing a predictive coding of digital video input signals. The apparatus comprises: (a) resolution determination means for selecting a picture resolution to be used in a video coding of a source picture of a current frame, the picture resolution being either a low resolution or a high resolution; (b) decoded picture storage means for storing a past decoded picture reproduced in a previous frame; (c) prediction parameter calculation means, coupled to the resolution determination means, for determining which of two coding schemes should be used to encode individual blocks, by comparing the source picture of the current frame with the past decoded picture stored in the decoded picture storage means, and also for calculating motion vectors of the blocks in the source picture, wherein the two coding schemes include an intraframe coding and an interframe coding, and the blocks are defined by partitioning a given picture into pieces according to the picture resolution determined by the resolution determination means; (d) prediction picture generation means for producing a prediction picture through calculation of pixel values on a block-by-block basis, the calculation of the pixel values including assignment of zeros to pixel values of the blocks subject to the intraframe coding, and calculation of the pixel values of the other blocks subject to the interframe coding, based on the past decoded picture stored in the decoded picture storage means and the motion vectors obtained by the prediction parameter calculation means; (e) prediction error signal generation means for producing a prediction error signal for each block by calculating differences between the source picture and the prediction picture; (f) first resolution conversion means for downsampling the prediction error signal produced by the prediction error signal generation means to provide the low resolution, depending upon the picture resolution determined by the resolution determination means; (g) orthogonal transformation/quantization means for applying an orthogonal transformation process and a quantization process to the prediction error signal processed by the first resolution conversion means; (h) code allocation means for outputting a code word relevant to a given set of data, which code word is retrieved out of a predefined code word table, wherein the given set of data includes at least the output of the orthogonal transformation/quantization means, the picture resolution determined by the resolution determine means, the coding scheme determined by the prediction parameter calculation means, and the motion vectors calculated by the prediction parameter calculation means, and the predetermined code word table contains a plurality of cord words previously assigned to each possible combination of the given set of data; (i) dequantization/inverse orthogonal transformation means for applying a dequantization process and an inverse orthogonal transformation process to the output of the orthogonal transformation/quantization means to reproduce the prediction error signal; (j) second resolution conversion means for applying an upsampling process to the reproduced prediction error signal sent from the dequantization/inverse orthogonal transformation means to provide the high resolution, if the reproduced prediction error signal has the low resolution processed by the first resolution conversion means, wherein the upsampling process, when calculating a pixel value in a block that is subject to one of the two coding schemes, does not refer to any pixels that belong to any other block adjacent to the block of interest if the adjacent block is subject to the other coding scheme, but refers at least to the pixels belonging to the block of interest; and (k) decoded picture generation means for constructing a decoded picture by adding the reproduced prediction error signal processed by the second resolution conversion means to the prediction picture produced by the prediction picture generation means, and for outputting the decoded picture to the decoded picture storage means.

To accomplish the above object, there is also provided another video coding apparatus for performing a predictive coding of digital video input signals. This apparatus comprises: (a) resolution determination means for selecting a picture resolution to be used in a video coding of a source picture of a current frame, the picture resolution being either a low resolution or a high resolution; (b) decoded picture storage means for storing a past decoded picture reproduced in a previous frame; (c) prediction parameter calculation means, coupled to the resolution determination means, for determining which of two coding schemes should be used to encode individual blocks, by comparing the source picture of the current frame with the past decoded picture stored in the decoded picture storage means, and also for calculating motion vectors of the blocks in the source picture, wherein the two coding schemes include an intraframe coding and an interframe coding, and the blocks are defined by partitioning a given picture into pieces according to the picture resolution determined by the resolution determination means; (d) prediction picture generation means for producing a prediction picture through calculation of pixel values on a block-by-block basis, the calculation of the pixel values including assignment of zeros to pixel values of the blocks subject to the intraframe coding, and calculation of the pixel values of the other blocks subject to the interframe coding, based on the past decoded picture stored in the decoded picture storage means and the motion vectors obtained by the prediction parameter calculation means; (e) prediction error signal generation means for producing a prediction error signal for each block by calculating differences between the source picture and the prediction picture; (f) first resolution conversion means for downsampling the prediction error signal produced by the prediction error signal generation means to provide the low resolution, depending upon the picture resolution determined by the resolution determination means; (g) orthogonal transformation/quantization means for applying an orthogonal transformation process and a quantization process to the prediction error signal processed by the first resolution conversion means; (h) code allocation means for outputting a code word relevant to a given set of data, which code word is retrieved out of a predefined code word table, wherein the given set of data includes at least the output of the orthogonal transformation/quantization means, the picture resolution determined by the resolution determine means, the coding scheme determined by the prediction parameter calculation means, and the motion vectors calculated by the prediction parameter calculation means, and the predetermined code word table contains a plurality of cord words previously assigned to each possible combination of the given set of data; (i) dequantization/inverse orthogonal transformation means for applying a dequantization process and an inverse orthogonal transformation process to the output of the orthogonal transformation/quantization means to reproduce the prediction error signal; (j) second resolution conversion means for applying an upsampling process to the reproduced prediction error signal sent from the dequantization/inverse orthogonal transformation means to provide the high resolution, if the reproduced prediction error signal has the low resolution processed by the first resolution conversion means; (k) prediction picture modification means for determining new values of pixels in a block that is adjacent to a block boundary, with reference to other pixels in another block adjacent to the block of interest, if the reproduced prediction error signal has the low resolution processed by the first resolution conversion means; and (l) decoded picture generation means for constructing a decoded picture by adding the reproduced prediction error signal processed by the second resolution conversion means to the prediction picture processed by the prediction picture modification means, and for outputting the decoded picture to the decoded picture storage means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 17 is a diagram showing how a predictive-coded source picture will be decoded in the conventional video coding apparatus.

DESCRIPTION OF THE PREFERRED EMBODIMENTS

Figure 1:
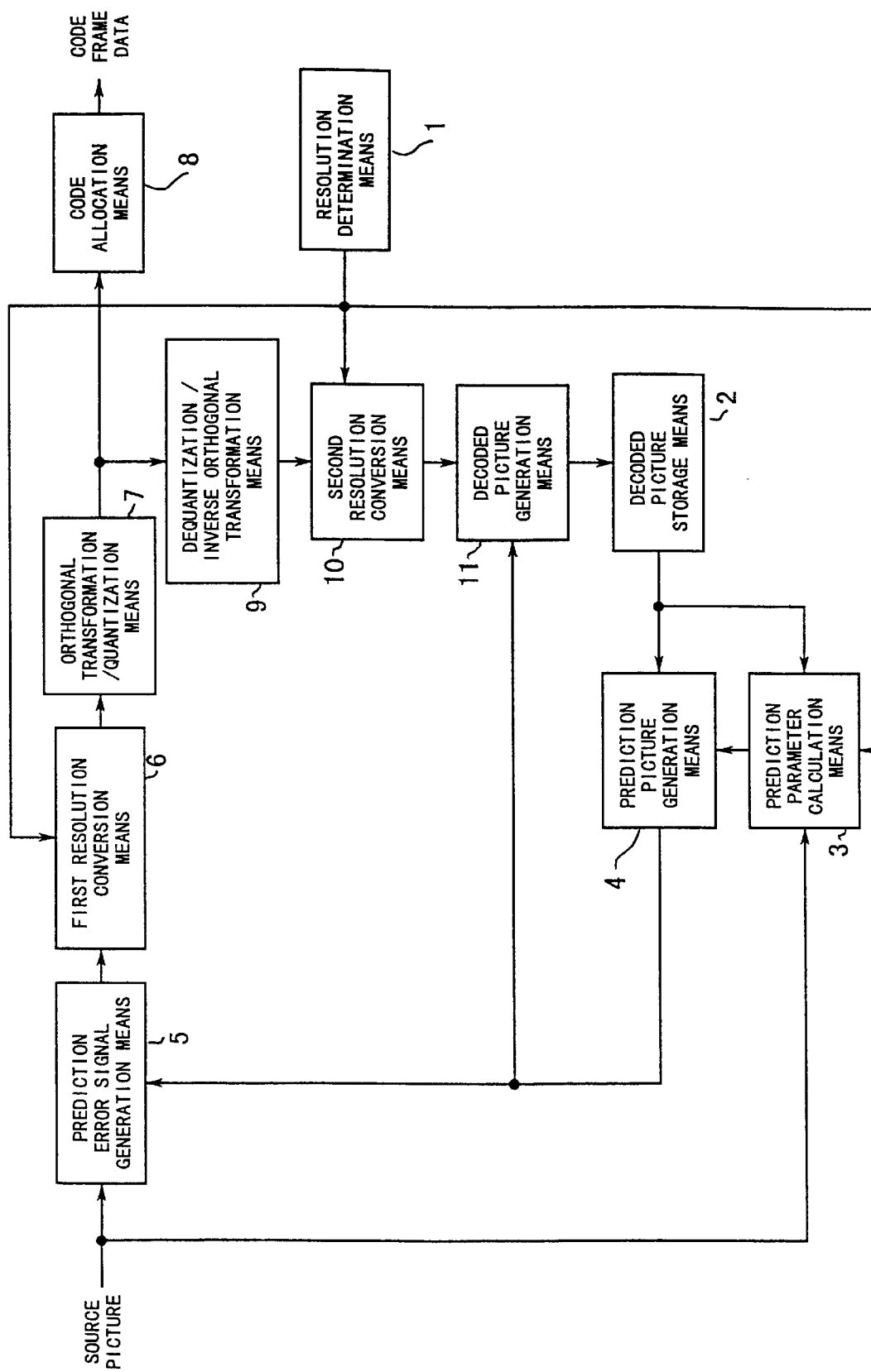
FIG. 1 is a first conceptual view of the present invention.

Several preferred embodiments of the present invention will be described below with reference to the accompanying drawings.

First, the concept of a first embodiment of the present invention will be explained, referring to FIG. 1. This first embodiment is specifically related to a video coding apparatus.

The first embodiment of the present invention proposes a video coding apparatus which comprises the following elements.

(a) Resolution determination means 1 for selecting a picture resolution to be used in a video coding of a source picture of a current frame. Here, the picture resolution can be either a low resolution or a high resolution.

(b) Decoded picture storage means 2 for storing a past decoded picture reproduced in a previous frame.

(c) Prediction parameter calculation means 3, coupled to the resolution determination means 1, for determining which of two coding schemes should be used to encode individual blocks, by comparing the source picture of the current frame with the past decoded picture stored in the decoded picture storage means. The prediction parameter calculation means 3 also calculates motion vectors of the blocks in the source picture. Note that the two coding schemes include an intraframe coding and an interframe coding, and the blocks are defined by partitioning a given picture into pieces according to the picture resolution determined by the resolution determination means 1.

(d) Prediction picture generation means 4 for producing a prediction picture through calculation of pixel values on a block-by-block basis. This calculation of the pixel values includes assignment of zeros as the pixel values of the blocks subject to the intraframe coding, and calculation of the pixel values of the other blocks subject to the interframe coding, based on the past decoded picture stored in the decoded picture storage means 2 and the motion vectors obtained by the prediction parameter calculation means 3.

(e) Prediction error signal generation means 5 for producing a prediction error signal for each block by calculating differences between the source picture and the prediction picture.

(f) First resolution conversion means 6 for downsampling the prediction error signal produced by the prediction error signal generation means 5 to provide the low resolution, depending upon the picture resolution determined by the resolution determination means 1.

(g) Orthogonal transformation/quantization means 7 for applying an orthogonal transformation process and a quantization process to the prediction error signal processed by the first resolution conversion means 6;

(h) Code allocation means 8 for outputting a code word relevant to a given set of data, which code word is retrieved out of a predefined code word table. Here, the given set of data includes at least the output of the orthogonal transformation/quantization means 7, the picture resolution determined by the resolution determine means 1, the coding scheme determined by the prediction parameter calculation means 3, and the motion vectors calculated by the prediction parameter calculation means 3. Note that the predetermined code word table contains a plurality of cord words previously assigned to each possible combination of the given set of data.

(i) Dequantization/inverse orthogonal transformation means 9 for applying a dequantization process and an inverse orthogonal transformation process to the output of the orthogonal transformation/quantization means 7 to reproduce the prediction error signal.

(j) Second resolution conversion means 10 for applying an upsampling process to the reproduced prediction error signal sent from the dequantization/inverse orthogonal transformation means 9 to provide the high resolution, if the reproduced prediction error signal has the low resolution processed by the first resolution conversion means 6. When calculating a pixel value in such a block that is subject to one of the two coding schemes, the upsampling process does not refer to any pixels that belong to any other block adjacent to the block of interest if the adjacent block is subject to the other coding scheme. The second resolution conversion means 10, however, refers at least to the pixels belonging to the block of interest.

(k) Decoded picture generation means 11 for constructing a decoded picture by adding the reproduced prediction error signal processed by the second resolution conversion means 10 to the prediction picture produced by the prediction picture generation means 4, and for outputting the decoded picture to the decoded picture storage means 2.

In the above-described structural arrangement, the resolution determination means 1 determines the picture resolution at which a source picture is to be coded. More specifically, the resolution determination means 1 selects a high resolution when the code allocation unit 8 have produced a smaller amount of coded data than a predetermined standard volume. It selects in turn a low resolution when the amount of the coded data is larger than the standard code volume.

For each block defined by partitioning the source picture according to the picture resolution determined by the resolution determination means 1, the prediction parameter calculation means 3 performs computation of a motion vector, as well as determining which coding scheme (i.e., intraframe or interframe) should be applied to the block. The prediction picture generation means 4 produces a prediction picture on a block-by-block basis, according to the output of the prediction parameter calculation means 3. That is, when the intraframe coding is applied to a certain block, the prediction picture generation means 4 outputs zeros for the pixel values of the block of interest as part of the prediction picture in process. When in turn the interframe coding is applied, the prediction picture generation means 4 produces a prediction picture of the block by applying the calculated motion vector to the relevant data retrieved from the decoded picture storage means 2 which stores the reconstructed pictures in some previous frames.

The prediction error signal generation means 5 produces a prediction error signal by calculating differences between the current frame picture and the prediction picture on a block-by-block basis. The produced prediction error signal is then subjected to the first resolution conversion means 6 for reduction of the picture resolution if it is required by the resolution determination means 1. More specifically, the first resolution conversion means 6 forwards the prediction error signal as is when the high resolution is selected by the resolution determination means 1, and it converts the picture resolution of the signal down to the low resolution when the low resolution is selected by the resolution determination means 1.

Next, the orthogonal transformation/quantization means 7 applies an orthogonal transformation and quantization processes to the output of the first resolution conversion means 6. The code allocation means 8 receives at least the output signal of the orthogonal transformation/quantization means 7, the picture resolution determined by the resolution determination means 1, and the coding scheme and motion vectors obtained by the prediction parameter calculation means 3. Some appropriate code words to represent various combinations of those kinds of data are prepared in a code word table. The code allocation means 8 retrieves such code words relevant to the received data and transmits them to the receiving ends via a transmission channel.

The dequantization/inverse orthogonal transformation means 9 dequantizes the output signal of the orthogonal transformation/quantization means 7, and it further executes an inverse orthogonal transformation to reproduce the prediction error signal as originally generated. In the case that the first resolution conversion means 6 has subsampled the original prediction error signal to reduce its resolution, the reproduced prediction error signal will, of course, have the reduced picture resolution. In this case, the second resolution conversion means 10 attempts to restore the original resolution by performing an upsampling process in the way described earlier. Recall that this upsampling process is a process to obtain the high-resolution pixel values from the values of some surrounding low-resolution pixels. In the present invention, however, the upsampling process will not refer to the pixels belonging to any adjacent block that is subject to another coding scheme which is different from that applied to the present block. As an alternate arrangement, the upsampling process can be implemented so that it will neglect the pixels in other blocks but will refer only to the present block of interest.

With such an upsampling algorithm, the present invention prevents the difference in coding schemes from affecting the reproduced prediction error signal, as opposed to the conventional upsampling process where the blocks with different coding schemes cause some unwanted noises in the reproduced signal as illustrated in the profile (d) of FIG. 17. As a result, the reproduced prediction error signal outputted by the second resolution conversion means 10 will have the original signal form as shown in the profile (c). The above-described resolution conversion will not be executed when the first resolution conversion means 6 did not downsample the original prediction error signal. In that case, the second resolution conversion means 10 forwards the reproduced prediction error signal as is.

The decoded picture generation means 11 reconstructs a picture by adding the reproduced prediction error signal sent from the second resolution conversion means 10 to the prediction picture produced by the prediction picture generation means 4. The resultant picture, or decoded picture, is then supplied to the decoded picture storage means 2.

In the way described above, the present invention can reproduce the motion pictures without introducing unwanted noises, even if some mixed coding schemes are used for encoding a frame, or in other words, even if two adjacent blocks exhibit a big difference in pixel values.

The first embodiment of the present invention will be described in further detail below.

Figure 3:
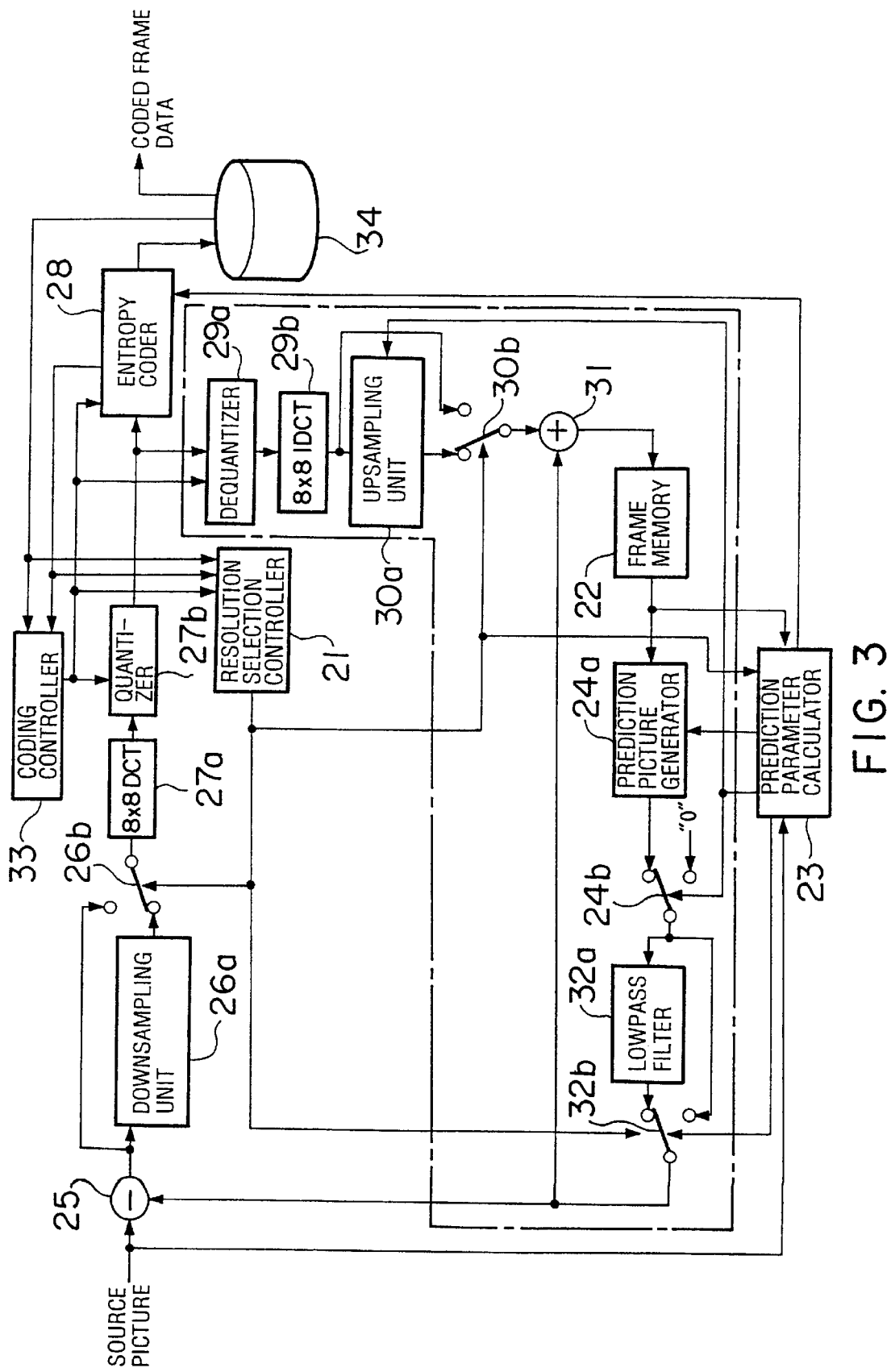
FIG. 3 is a block diagram showing a specific structure of a first embodiment of the present invention.

FIG. 3 is a block diagram showing a specific structure of the first embodiment of the present invention. In FIG. 3, a resolution selection controller 21, which corresponds to the resolution determination means 1 in FIG. 1, receives the quantizer step size from a control unit 33 (described later). It also receives the amount of coded frame data from an entropy coder 28, and the buffer occupancy information from a coded data buffer 34. Based on all the received information, the resolution selection controller 21 determines an appropriate picture resolution for each frame, so that the video information delivered to the receiving ends will not suffer from intolerable image quality degradation due to the coarse subsampling of frames. In the first embodiment, the resolution selection controller 21 normally chooses a high resolution of 352×288 pixels, or the CIF resolution. When a large amount of coded data is produced as a result of the coding process, it chooses a low resolution of 176×144 pixels, or the QCIF resolution. The resolution selection controller 21 can be configured, as an alternative arrangement, such that it will switch three or more kinds of resolutions. As for the applicable algorithms for determining the picture resolution, the aforementioned Japanese Patent Application No. 8-75605 (1996), for example, provides some detailed description. Notification of the determined resolution is sent to a downsampling switch 26*b*, a lowpass filter switch 32*b*, a prediction parameter calculator 23, and an upsampling switch 30*b* as described later. It is also supplied to an entropy coder 28 although the signal flow is not illustrated in FIG. 3.

A frame memory 22, serving as the decoded picture storage means 2 in FIG. 1, is used to store picture data of one or more frames reconstructed in the past few coding cycles. A prediction parameter calculator 23 is what is described as the prediction parameter calculation means 3 in FIG. 1. For each block obtained by partitioning the source picture according to the picture resolution determined by the resolution selection controller 21, the prediction parameter calculator 23 calculates a motion vector, as well as determining the coding scheme (i.e., intraframe or interframe) to be applied. The size of each block depends on the resolution determined by the resolution selection controller 21. It is either 16×16 pixels for CIF resolution or 32×32 pixels for QCIF resolution. The information about the determined coding scheme is sent to the prediction picture switch 24*b* and the upsampling unit 30a, while the calculated motion vector of each block is supplied to the lowpass filter switch 32b and the entropy coder 28.

A prediction picture generator 24a and prediction picture switch 24b serve as the prediction picture generation means 4 shown in FIG. 1. The prediction picture generator 24a retrieves a relevant past decoded picture from the frame memory 22 and then applies the motion vectors sent from the prediction parameter calculation unit 23 to the retrieved picture to construct a prediction picture of the current frame. The prediction picture switch 24b is a switch to control the content of the prediction pictures on a block-by-block basis, in accordance with the coding scheme specified by the prediction parameter calculator 23. More specifically, the prediction picture switch 24b outputs zeros for the predicted pixel values when the block is subjected to the intraframe coding. It, in turn, selects the prediction picture output of the prediction picture generator 24a when the interframe coding is specified.

A lowpass filter 32a removes high-frequency components contained in each predicted block. Based on each block's motion vector sent from the prediction parameter calculator 23, a lowpass filter switch 32b examines how fast each block is moving, thereby classifying the blocks into two groups: fast-motion group and less-motion group. The lowpass filter switch 32b further uses the picture resolution provided by the resolution selection controller 21 to determine whether or not to activate the high-frequency components. More specifically, when the QCIF resolution is specified and the block of interest falls into the fast-motion group, the lowpass filter switch 32b selects the output of the lowpass filter 32a. On the other hand, when the QCIF resolution is specified but the block falls into the less-motion group, or when the CIF resolution is specified, the lowpass filter switch 32b will bypass the lowpass filter 32a.

Essentially, the frequency response of a predictive coding process is subject to the Nyquist bandwidth limitation. That is, when operating with the QCIF picture format, the coding process is unable to encode the frequency components beyond the Nyquist frequency ($\tau 1$) defined by the QCIF resolution. The higher-frequency components beyond $\tau 1$, if exist, could cause some coding errors to accumulate in the coding loop, resulting in a deterioration in the quality of pictures with the passage of time. It is therefore necessary to remove such unwanted higher-frequency components from the prediction picture to prevent the coding error from accumulating, and this is why the lowpass filter 32a is incorporated in the video coding apparatus of the present invention.

On the other hand, a picture generally consists of areas exhibiting relatively slow or no motions (e.g., background image) and areas containing fast motions (e.g., actor or actress). If the above-described low-pass filter is applied to the blocks in less active areas, the resultant high-frequency suppression will spoil the sharpness of the picture in those areas. Since there is, of course, no need to further reduce the picture information in such less active areas that can be coded at a high compression ratio, the high-frequency suppression should not be applied to them.

For that reason, the video coding apparatus of FIG. 3 is configured so that the lowpass filter switch 32b will select the prediction picture with its high-frequency components eliminated by the lowpass filter 32a, only when the QCIF resolution is specified and the block falls into the fast-motion group.

Figure 15:
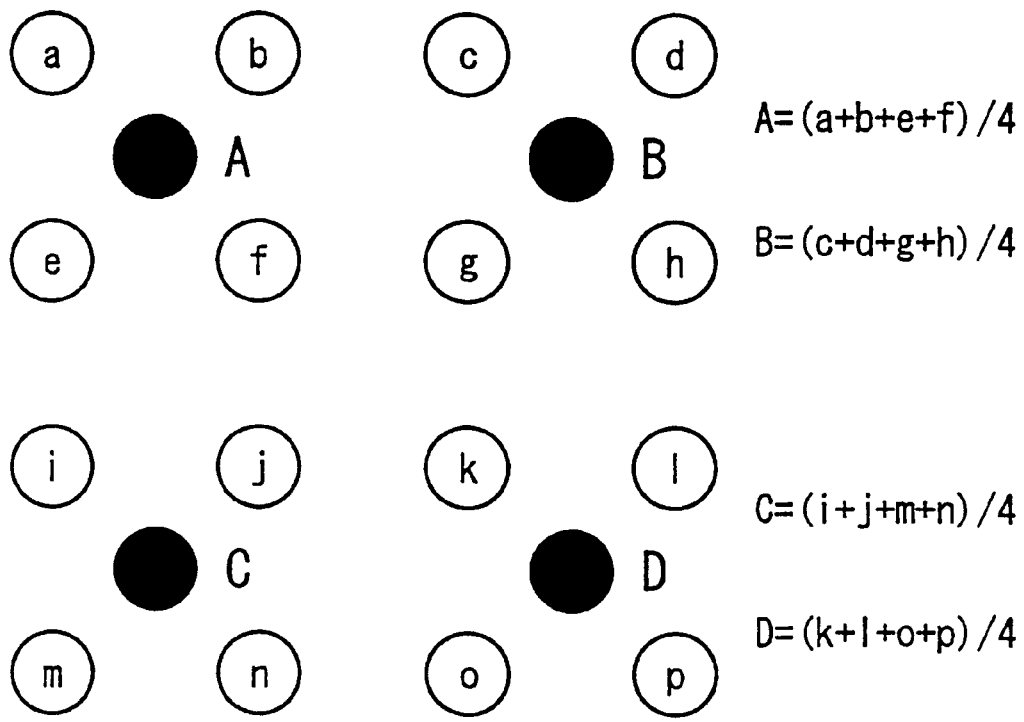
FIG. 15 is a diagram to explain a conventional downsampling process.

A prediction error signal generation unit 25 serves as the prediction error signal generation means 5 in FIG. 1. The combination of a downsampling unit 26a and downsampling switch 26b corresponds to the first resolution conversion means 6 in FIG. 1. The prediction error signal produced by the prediction error signal generation unit 25 for each block is supplied to the downsampling unit 26a to apply a downsampling process as described earlier with reference to FIG. 15. The downsampling switch 26b is used to bypass the downsampling process for the prediction error signal, depending on the picture resolution received from the resolution selection controller 21. For the blocks where the CIF resolution is specified, it selects the direct output of the prediction error signal generation unit 25, and for the blocks where the QCIF resolution is specified, it chooses the output of the downsampling unit 26a.

The orthogonal transformation/quantization means 7 in FIG. 1 is implemented as a combination of a DCT processor (8×8 DCT) 27a and quantizer 27b. The DCT processor 27a performs a discrete cosine transform for every 8×8 pixel block, thereby yielding a set of transform coefficients. The quantizer 27b quantizes the transform coefficients according to the quantizer step size sent from the coding controller 33 (described later). The obtained values are referred to as quantized coefficients.

The coding controller 33 receives information on the amount of the resultant coded data from an entropy coder 28 (described later), as well as being informed of the buffer occupancy by a coded data buffer 34. Based on those two kinds of information, the coding controller 33 determines and distributes the quantizer step size to the quantizer 27b, dequantizer 29a, resolution selection controller 29a, and entropy coder 28.

The entropy coder 28, serving as the code allocation means 8 in FIG. 1, receives the quantized coefficients from the quantizer 27b, the picture resolution from the resolution selection controller 21 (signal flow omitted in FIG. 3), the quantizer step size from the coding controller 33, and the coding scheme and motion vectors from the prediction parameter calculator 23. Out of a prepared code table, the entropy coder 28 retrieves code words relevant to the individual combinations of those received data, thereby outputting the coded frame data. The coded data buffer 34 serves as temporary storage for the coded frame data produced by the entropy coder 28.

Figure 16:
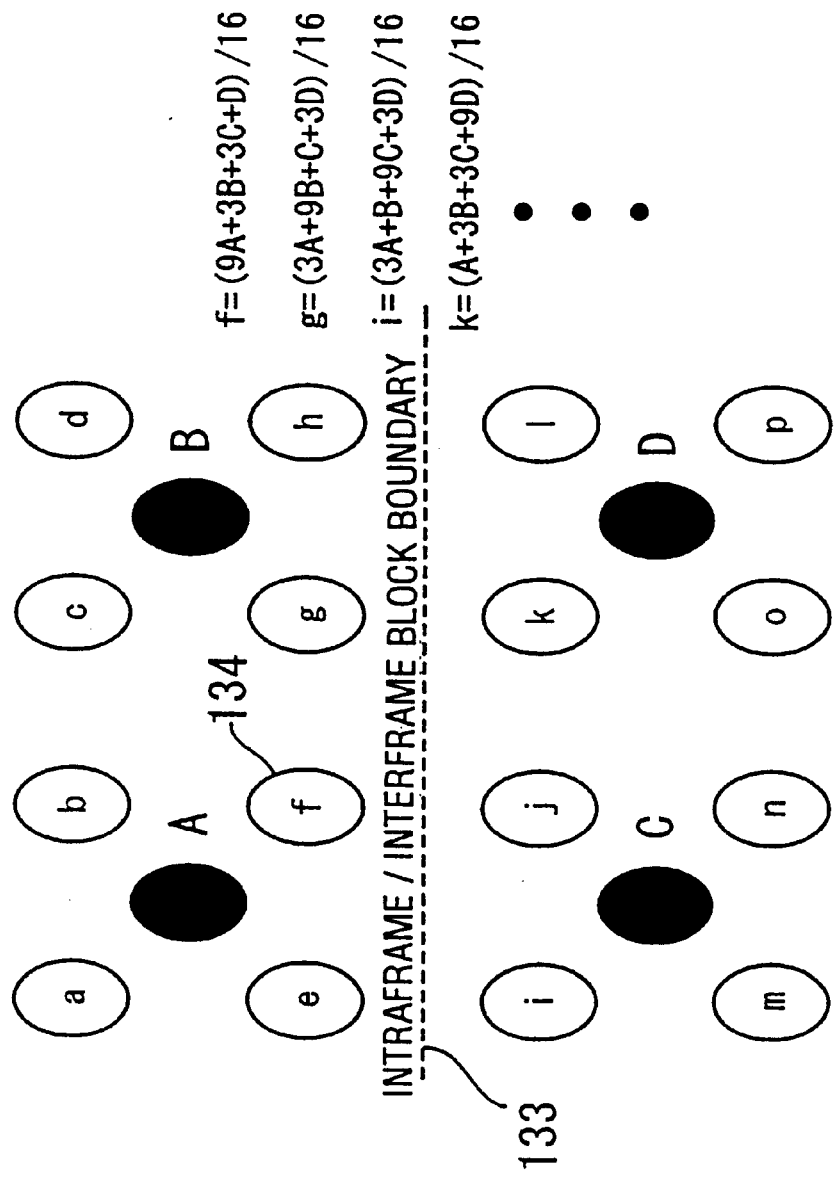
FIG. 16 is a diagram to explain a conventional upsampling process.

A dequantizer 29a and an IDCT processor (8×8 IDCT) 29b work as the dequantization/inverse orthogonal transformation means 9 in FIG. 1. An upsampling unit 30a and an upsampling switch 30b operate in combination as the second resolution conversion means 10 in FIG. 1. When attempting to process a block in a certain coding scheme determined by the prediction parameter calculator 23, the upsampling unit 30a first examines whether or not the block of interest is adjacent to any blocks being subject to the different coding scheme. If such a neighboring block is found, the upsampling unit 30a will convert the block of interest to increase the resolution by upsampling the pixels. The upsampling algorithm used in this case will be described later with reference to FIG. 4. If the block has no such neighboring blocks, the upsampling unit 30a performs a conventional upsampling process as illustrated in FIG. 16. The upsampling switch 30b allows the reproduced prediction error signal to bypass the upsampling process, depending on the picture resolution received from the resolution selection controller 21. For the blocks where the CIF resolution is specified, it selects the exact output of the IDCT processor 29b, and for the blocks where the QCIF resolution is specified, it chooses the output of the upsampling unit 30a. As a result, the reproduced prediction error signal supplied to the next stage will consistently have the CIF resolution.

A decoded picture generation unit 31 corresponds to the decoded picture generation means 11 in FIG. 1. The decoded picture generation unit 31 conducts the summation of the prediction picture and the reproduced prediction error signal to obtain a fully decoded picture. Note that all the signals involved in this summation have a unified resolution, i.e., the CIF. The decoded picture is saved to the frame memory 22 for future retrieval.

Figure 4:
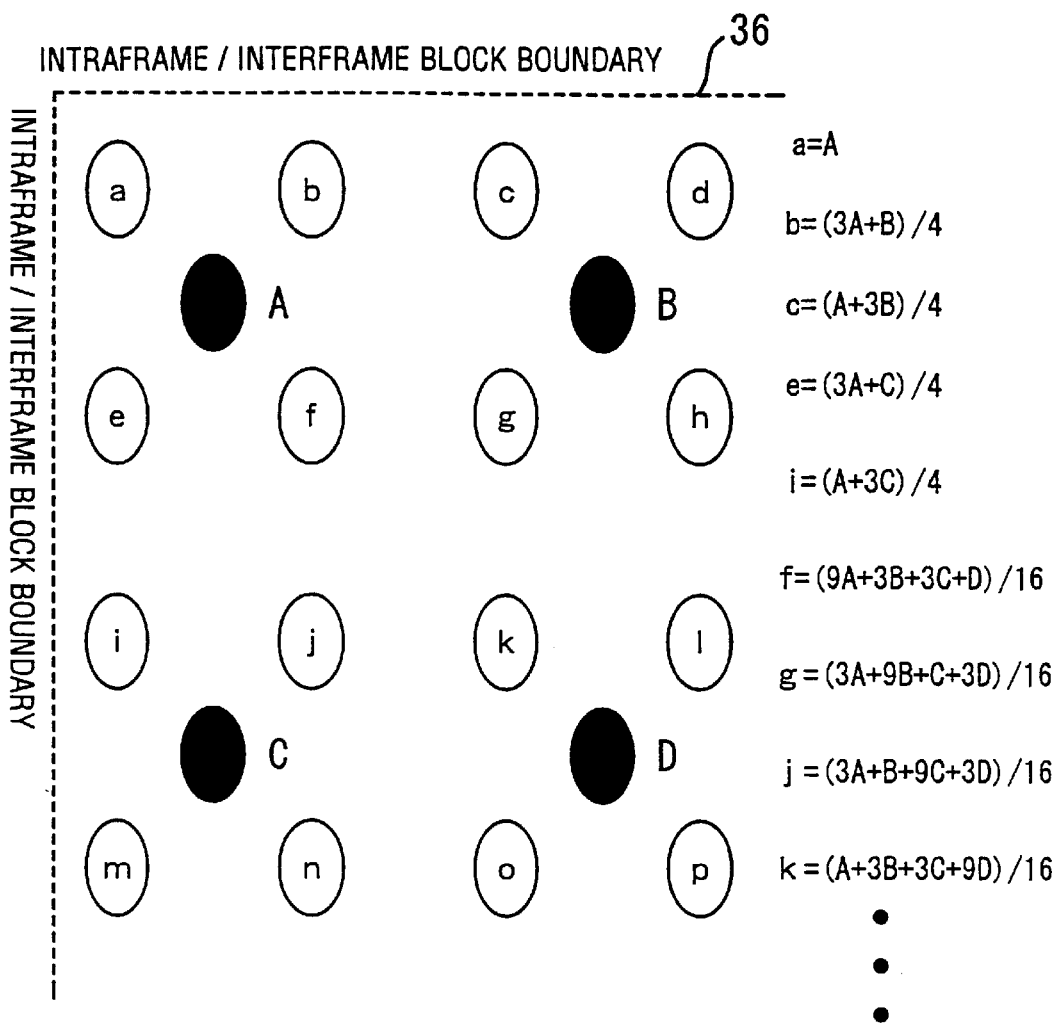
FIG. 4 is a diagram to explain an upsampling process executed by an upsampling unit.

FIG. 4 depicts the above upsampling process performed by the upsampling unit 30a. Referring to FIG. 4, black dots represent QCIF pixels, and upper-case alphabetical characters are affixed to them to indicate their respective prediction error signal levels. Also, white dots represent CIF pixels, and lower-case letters indicate their respective prediction error signal levels. There is a block boundary 36 as represented by a dashed line, at which the applied coding scheme is switched from intraframe to interframe or vise versa.

With respect to the prediction error signal values of inner CIF pixels not immediately adjacent to the block boundary 36, the upsampling unit 30a calculates a weighted average of the values of four QCIF pixels surrounding each CIF pixel. For example, a CIF pixel value f is obtained by calculating $$f=(9A+3B+3C+D)/16, \quad (4)$$

where the four QCIF values are summed up with appropriate weighting factors determined by their respective distances from the CIF pixel in process. Note that this algorithm is the same as the conventional upsampling algorithm explained in FIG. 16.

As opposed to the above, the prediction error signal values at the pixels located immediately adjacent to the block boundary 36 are calculated by the upsampling unit 30a, considering only two neighboring QCIF pixels, or without referring to the pixels beyond the block boundary 36 which are subject to the different coding scheme. For example, the signal value b is obtained as $$b=(3A+B)/4. \quad (5)$$

Another pixel value, say i, is obtained by calculating a weighted average value $$i=(A+3C)/4, \quad (6)$$

similarly referring only to two OCIF pixels. As for still another pixel labeled a at a corner of the block boundary 36, its value is calculated with reference to a single QCIF pixel as $$a=A. \quad (7)$$

By virtue of the above-described upsampling algorithm, the present invention prevents the difference in coding schemes from affecting the reproduced prediction error signal, as opposed to the conventional upsampling process where the blocks with different coding schemes may cause some undesired noises in the reproduced prediction error signal as illustrated in the signal profile (d) of FIG. 17. As a result, the reproduced prediction error signal appearing at the output of the upsampling unit 30a will exhibit a near-original signal profile as shown in the signal profile (c).

Therefore, the present invention can reproduce the original pictures without introducing noises, even if some mixed coding schemes are used for compressing a frame, or even if there exists a considerable difference in pixel values at a certain block boundary.

In the above-described first embodiment, the proposed upsampling unit 30a examines whether or not the block of interest is adjacent to any other block being subject to the different coding scheme, and if such a neighboring block is found, it will upsample the pixels using the algorithm explained in FIG. 4. As an alternate algorithm, however, it is also possible to simply upsample every block by using the values of its inner pixels, regardless of whether or not the block is adjacent to the boundary between different coding schemes. While having a minor fault that the sharpness of source pictures may be somewhat lost in the decoded pictures, this alternative method will reduce the hardware cost and improve the performance, because of its advantage in simplicity of the upsampling unit 30a.

Next, a second embodiment of the present invention, also related to a video coding apparatus, will be described below.

Figure 5:
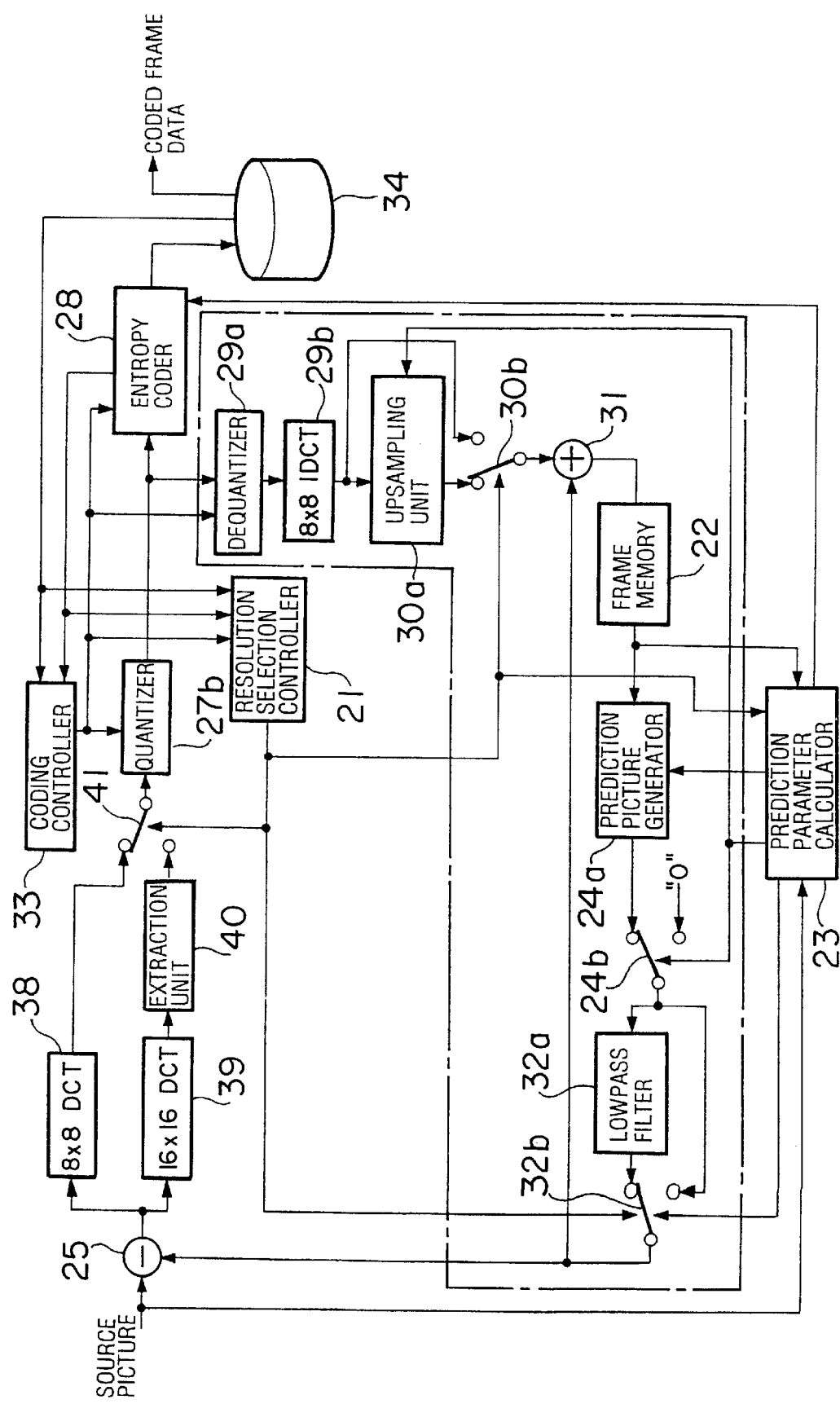
FIG. 5 is a block diagram showing the structure of a second embodiment of the present invention.

FIG. 5 is a block diagram showing the structure of the second embodiment of the present invention. Since the second embodiment has basically the same structure as that of the first embodiment, the following description will focus on its distinctive points, while affixing like reference numerals to like elements.

Compared with the first embodiment, the second embodiment is distinguishable in that an 8×8 DCT processor 38, a 16×16 DCT processor 39, an extraction unit 40, and a selector 41 are introduced in place of the downsampling unit 26a, downsampling switch 26b, and DCT processor 27a of the first embodiment. The second embodiment effectively uses the similarity between a 16×16 orthogonal transform and an 8×8 orthogonal transform in their bases. More specifically, the 16×16 DCT processor 39 applies a 16×16 orthogonal transform to the prediction error signal with CIF format, and the extraction unit 40 extracts the low-frequency components out of the obtained transform coefficients. The components extracted as such will be a good estimate of the transform coefficients that would be obtained through an 8×8 orthogonal transform of subsampled QCIF pictures. On the other hand, the 8×8 DCT processor 38, disposed in parallel with the 16×16 DCT processor 39 and extraction unit 40, applies an 8×8 orthogonal transform to the same prediction error signal.

Accordingly, the selector 41 selects either set of transform coefficients, depending on the picture resolution received from the resolution selection controller 21. For the blocks where the CIF resolution is specified, the selector 41 chooses the output of the 8×8 DCT processor 38, and for the blocks where the QCIF resolution is specified, it in turn chooses the output of the extraction unit 40. The quantizer 27b then receives the set of transform coefficients that was selected.

Besides providing the same functions as the first embodiment does, the second embodiment will greatly reduce the amount of computation loads in comparison to the first embodiment.

Next, a third embodiment of the present invention, in relation to a video coding apparatus, will be described below.

Figure 6:
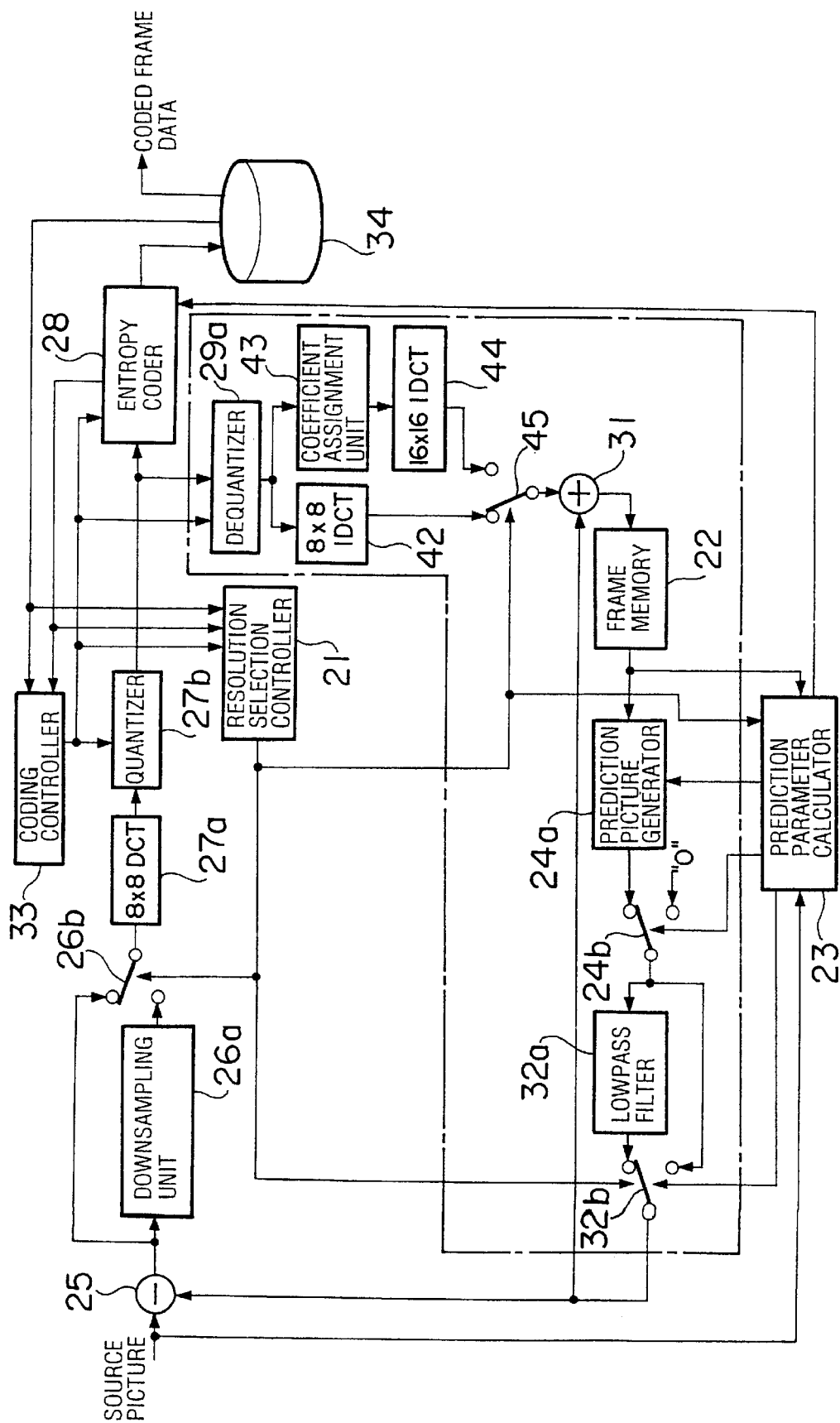
FIG. 6 is a block diagram showing the structure of a third embodiment of the present invention.

FIG. 6 is a block diagram showing a specific structure of the third embodiment of the present invention. Since the third embodiment has basically the same structure as that of the first embodiment, the following description will focus on its distinctive points, while affixing like reference numerals to like elements.

The third embodiment is distinguishable from the first embodiment in that an 8×8 IDCT processor 42, an assignment unit 43, a 16×16 IDCT processor 44, and a selector 45 are introduced in place of the upsampling unit 30a, upsampling switch 30b, and IDCT processor 29b of the first embodiment. As in the second embodiment, the third embodiment uses the similarity between a 16×16 orthogonal transform and an 8×8 orthogonal transform in terms of the transform basis. More specifically, the coefficient assignment unit 43 regards the dequantized 8×8 transform coefficients sent from the dequantizer 29*a* as 8×8 low-frequency components as part of a 16×16 transform coefficient block. The coefficient assignment unit 43 further assigns zeros to the remaining transform coefficients. The 16×16 transform coefficient block formed as such is then subjected to an inverse transformation by the IDCT processor 44. The prediction error signal reproduced through this process is nearly the same as that reproduced from transform coefficients of a CIF image. On the other hand, the 8×8 IDCT processor 42, disposed in parallel with the coefficient assignment unit 43 and 16×16 IDCT processor 44, applies an 8×8 inverse orthogonal transform to the same dequantized 8×8 transform coefficients.

The selector 45 selects either one of the output signals of the two IDCT processors 42 and 44, depending on the picture resolution received from the resolution selection controller 21. For the blocks where the CIF resolution is specified, the selector 45 selects the output of the 8×8 DCT processor 42, and for the blocks where the QCIF resolution is specified, it chooses the output of the 16×16 IDCT processor 44. The reproduced prediction error signal selected as such is then provided to the decoded picture generation unit 31.

Besides offering the same functions as the first embodiment provides, the third embodiment of the present invention will greatly reduce the amount of necessary computation loads in comparison to the first embodiment.

Next, a fourth embodiment of the present invention will be described below. Unlike the earlier three embodiments, this fourth embodiment is related to a video decoding apparatus.

Figure 7:
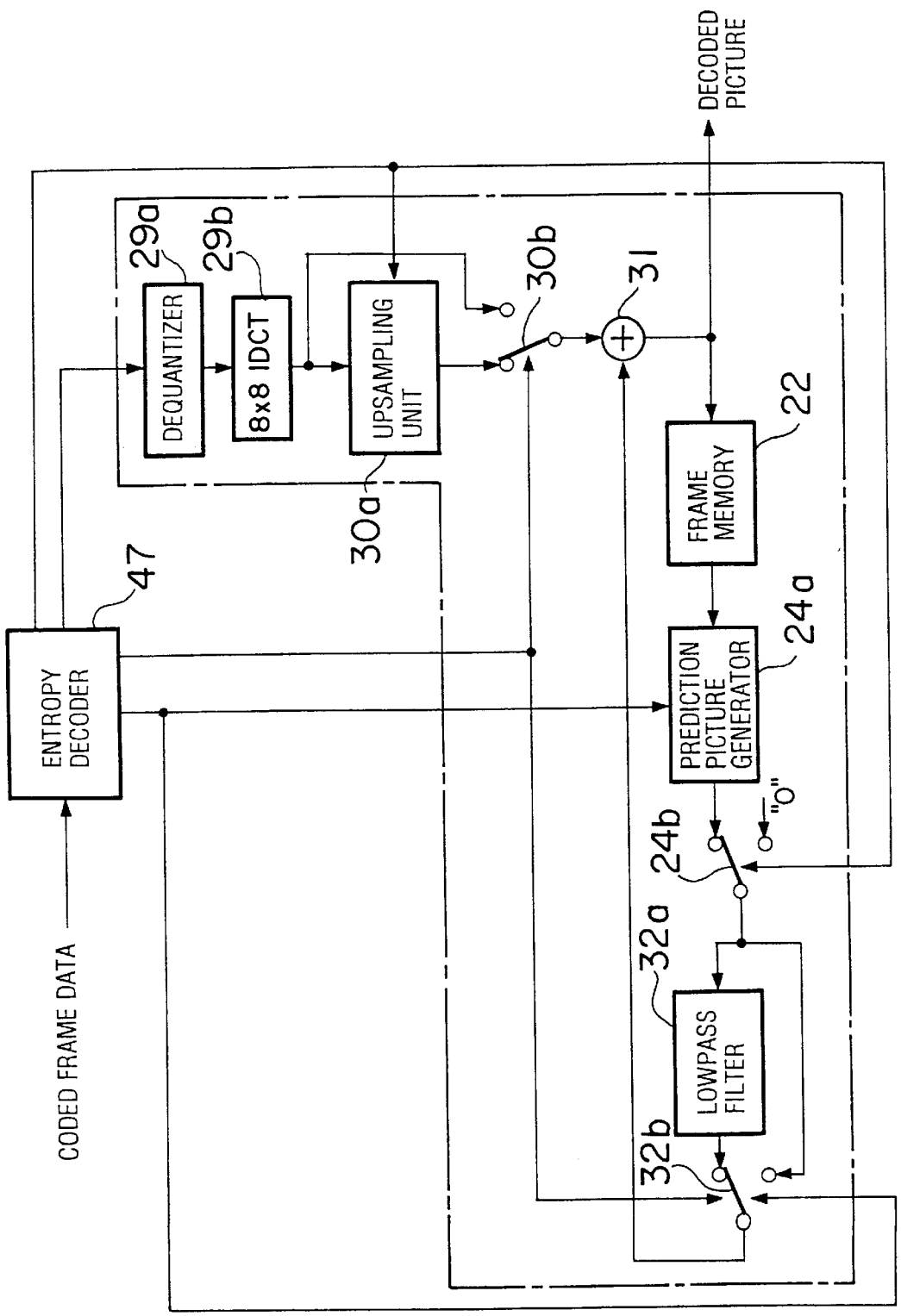
FIG. 7 is a block diagram showing the structure of a fourth embodiment of the present invention.

FIG. 7 is a block diagram showing the structure of the fourth embodiment of the present invention. Since the fourth embodiment employs some elements common to the first embodiment, the following description will not repeat the explanation for such elements, while affixing like reference numerals to like elements.

Referring to FIG. 7, an entropy decoder 47 reproduces data such as quantized coefficients, picture resolution, quantizer step size, coding scheme, and motion vectors, out of the coded frame data received from a sending end. The entropy decoder 47 distributes those reproduced data to other functional blocks in the apparatus. More specifically, the quantized coefficients and quantizer step size are sent to the dequantizer 29*a*; the picture resolution is delivered to the upsampling switch 30*b* and lowpass filter switch 32*b*; the coding scheme is supplied to the prediction picture switch 24*b* and upsampling unit 30*a*; the motion vectors are provided to the prediction picture generator 24*a* and lowpass filter switch 32*b*. Operations of those functional blocks within the area indicated by the alternating long and short dashes will not be described here, because they work in the same way as described in the first embodiment.

The output of this video decoding apparatus will branch off from the decoded picture generation unit 31. That is, the decoded pictures fully reconstructed by the decoded picture generation unit 31 are outputted to an external video monitor or like devices, while being saved in the frame memory 22 as the reference frames for predictive coding.

In the way described above, the video decoding apparatus of the fourth embodiment receives and decodes the coded video signal produced by a video coding apparatus. This decoding process employs the upsampling unit 30*a*. As in the first embodiment of the present invention, the upsampling unit 30*a* allows the pictures to be reproduced without noises or artifacts, even if some different coding schemes are used for compressing a frame, or in other words, even if the pixel values exhibit a big difference at a certain block boundary.

Next, a fifth embodiment of the present invention will be described below. This fifth embodiment is related to a video coding apparatus.

Figure 2:
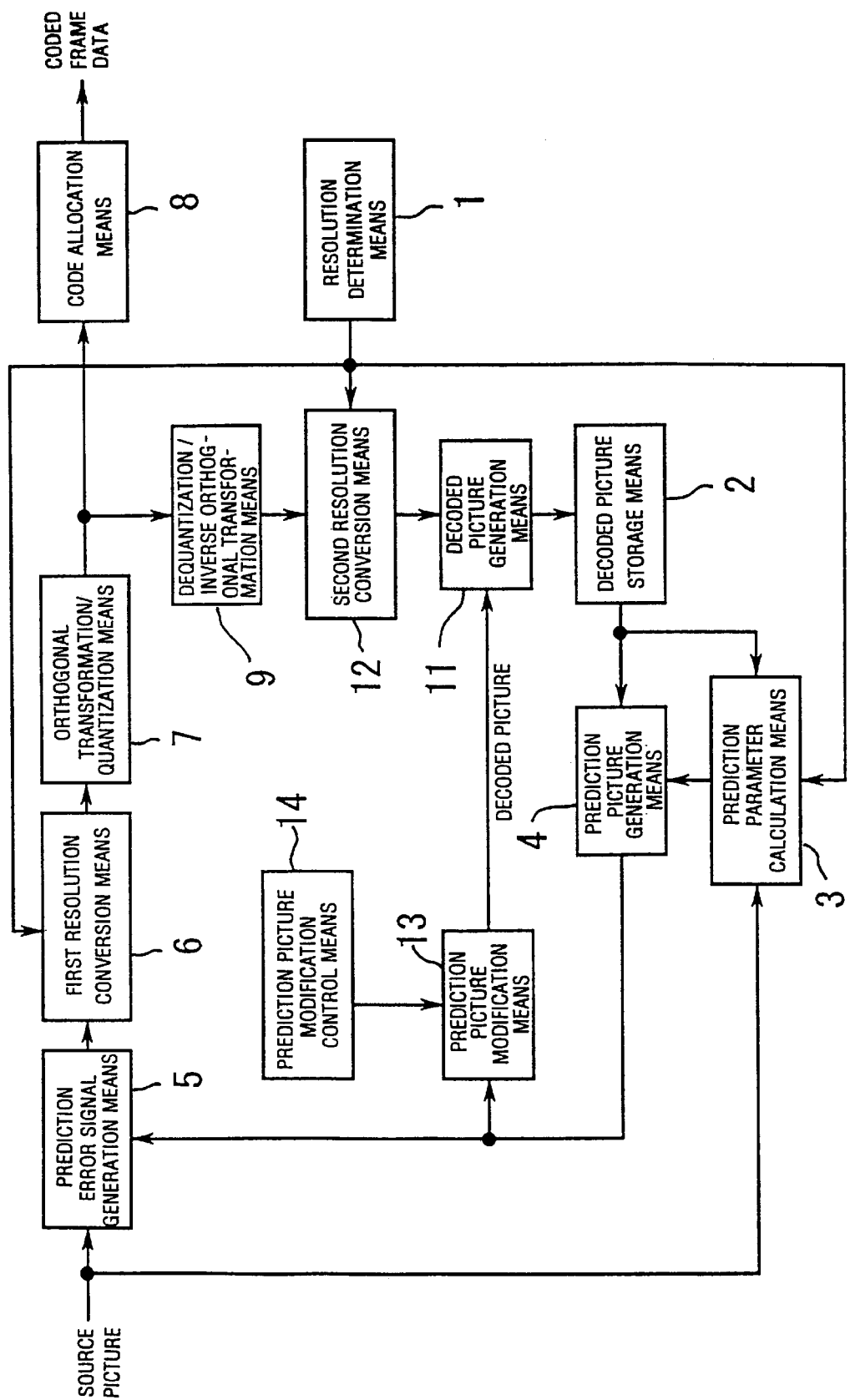
FIG. 2 is a second conceptual view of the present invention.

FIG. 2 shows the concept of the fifth embodiment. Because of its similarity to the first embodiment depicted in FIG. 1, like reference numerals are affixed to like elements in FIG. 2.

The fifth embodiment is distinguishable from the first embodiment in that a second resolution conversion means 12 functions differently from the second resolution means recited in the first embodiment, and also in that the video coding apparatus further comprises prediction picture modification means 13 disposed between the prediction picture generation means 4 and decoded picture generation means 11. Further, the fifth embodiment comprises prediction picture modification control means 14 which is linked to the prediction picture modification means 13.

In the case that the first resolution conversion means 6 downsampled the original prediction error signal to reduce its picture resolution, the prediction error signal reproduced by the dequantization/inverse orthogonal transformation means 9 will have the same reduced picture resolution. In that case, the second resolution conversion means 12 attempts to restore the original resolution by performing an upsampling process. In the fifth embodiment, this upsampling process may refer to the pixels belonging to the blocks beyond a block boundary regardless of the magnitude of those pixel values, as in the conventional upsampling algorithms.

When the first resolution conversion means 6 has downsampled the original prediction error signal to reduce the picture resolution, the prediction picture modification control means 14 determines whether or not to modify the values of pixels located near a particular block boundary. In the case that the first resolution conversion means 6 downsampled the original prediction error signal to reduce the picture resolution, and if the prediction picture modification control means 14 has determined to modify the pixel values at the particular block boundary, the prediction picture modification means 13 will modify the values of the pixels located along the particular block boundary, with reference to other pixels beyond that boundary.

More specifically, the prediction picture modification control means 14 examines the prediction picture produced by the prediction picture generation means 4 to evaluate the block-to-block difference in terms of pixel values. If a any critical difference exceeding a certain threshold level is observed in any particular blocks, the prediction picture modification control means 14 regards the boundary between such blocks as the aforementioned particular block boundary. Here, this particular block boundary is referred to as a critical block boundary where modification of pixel values is required. In reality, however, the critical block boundary may not be directly identified by bitwise comparison of pixels, but is estimated through observation of blocks based on either of the following two criteria.

The first criterion is the difference in coding schemes being applied to adjacent blocks. The prediction picture modification control means 14 examines the coding schemes actually assigned by the prediction parameter calculation means 3 for each block. If a block of interest is adjacent to any other blocks that are subject to a different coding scheme, the prediction picture modification control means 14 recognizes the boundary of the two adjacent blocks as a critical boundary.

The second criterion is the difference in motion vectors. Here, the motion vectors produced by the prediction parameter calculation means 3 are evaluated on a block-by-block basis. More specifically, the prediction picture modification control means 14 compares the motion vector of a block of interest with that of any adjacent block. If the observed difference in vector magnitude is larger than a predetermined threshold, the prediction picture modification control means 14 recognizes that block boundary as a critical boundary.

In short, any block-to-block difference in coding schemes applied implies the presence of some critical differences in pixel values. Alternatively, discontinuous variations observed in the motion vector domain will provide the same implication. The prediction picture modification control means 14 detects such critical differences and determines to modify the pixel values along the critical block boundary. Then the prediction picture modification control means 14 commands the prediction picture modification means 13 to make a smoothing operation to eliminate the discontinuity in the pixel values.

Figure 11:
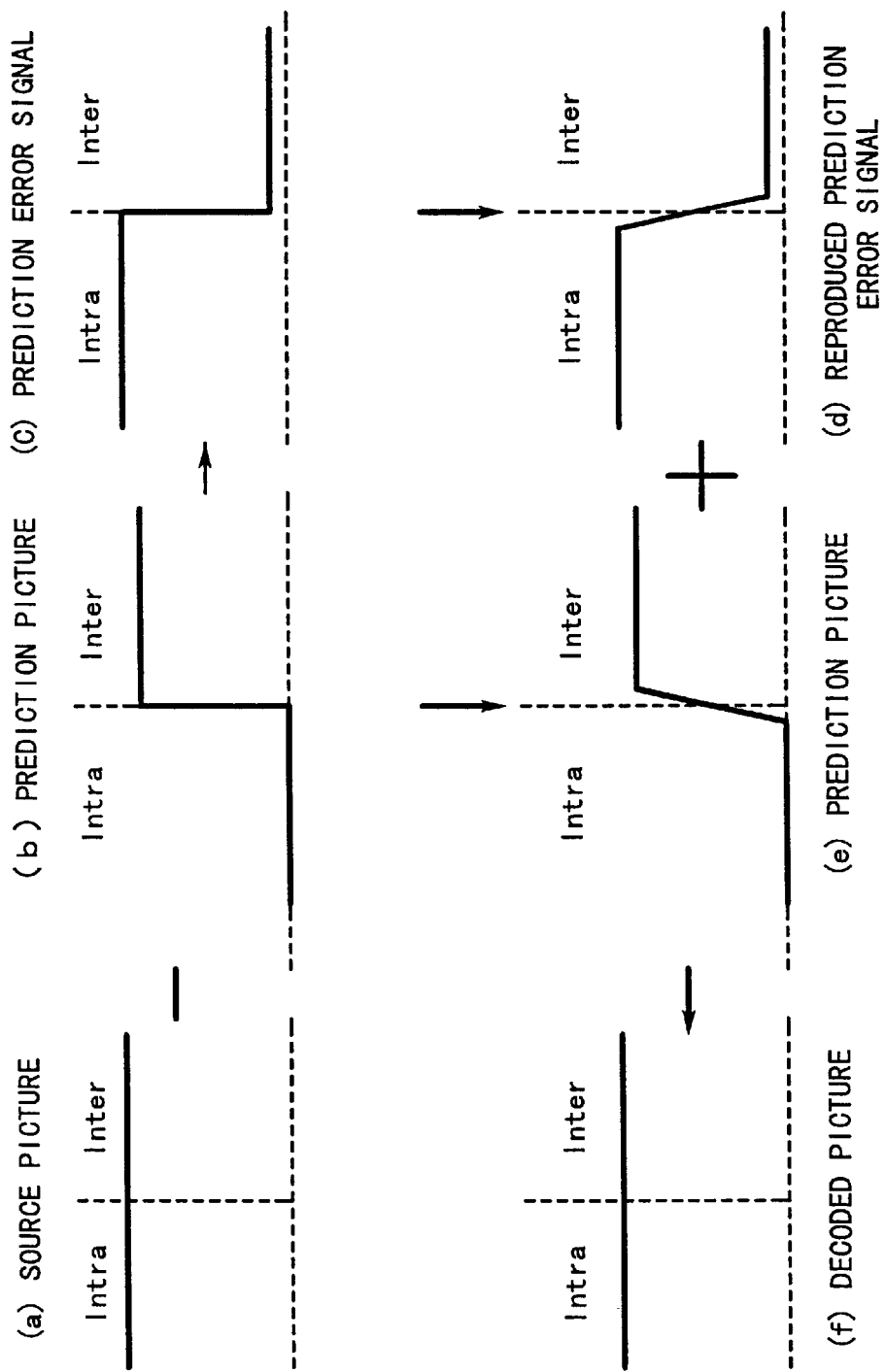
FIG. 11 is a diagram showing how a predictive-coded source picture will be decoded in a video coding apparatus of the present invention.

See FIG. 11, for example, which shows some specific profiles of pixel values at some points in a video coding apparatus according to the present invention. In FIG. 11, a source picture (a) contains both kinds of blocks, one subject to intraframe coding and the other subject to interframe coding. The boundary of those different kinds of blocks is indicated by a vertical dashed line. Since the intraframe-coding block on the left side have no reference frame for frame prediction, their pixel values in the prediction picture (b) will simply be set to zeros. Accordingly, the resultant prediction error signal (c) will exhibit large values in the intraframe-coding block, while showing small values for the interframe-coding block.

In such a situation where two adjacent blocks are coded with different schemes (i.e., intraframe and interframe), the upsampling process executed by the second resolution conversion means 12 will cause a mixture of differently coded pixel values in the vicinity of the block boundary, introducing some distortion in the reproduced prediction error signal (d), as is the case of the conventional upsampling process noted earlier.

On the other hand, according to the present invention, the prediction picture modification means 13 applies a smoothing operation to the pixels located along the critical block boundary in the prediction picture (b), thereby yielding a smoothed prediction picture (e). By adding the reproduced prediction error signal (d) to the smoothed prediction picture (e), the decoded picture generation means 11 finally renders the decoded picture (f) which is quite similar to the original source picture (a). That is, the video coding apparatus of the fifth embodiment prevents any noises from being introduced in the vicinity of block boundaries in the decoded picture, unlike the conventional video coding apparatus which suffer from this kind of noises.

The above-described image smoothing will not be executed when the first resolution conversion means 6 did not apply the downsampling process to the original prediction error signal. In that case, the prediction picture modification means 13 forwards the prediction picture as is to the decoded picture generation means 11.

The above discussion, which assumed the presence of such blocks that have been processed with two different coding schemes, is also applicable to the case that there is a considerable difference between two adjacent blocks in terms of magnitude of motion vectors.

In the way described above, the fifth embodiment allows the pictures to be reproduced without undesired noises, even if some pixel values exhibit some discontinuity at a certain block boundary.

Figure 8:
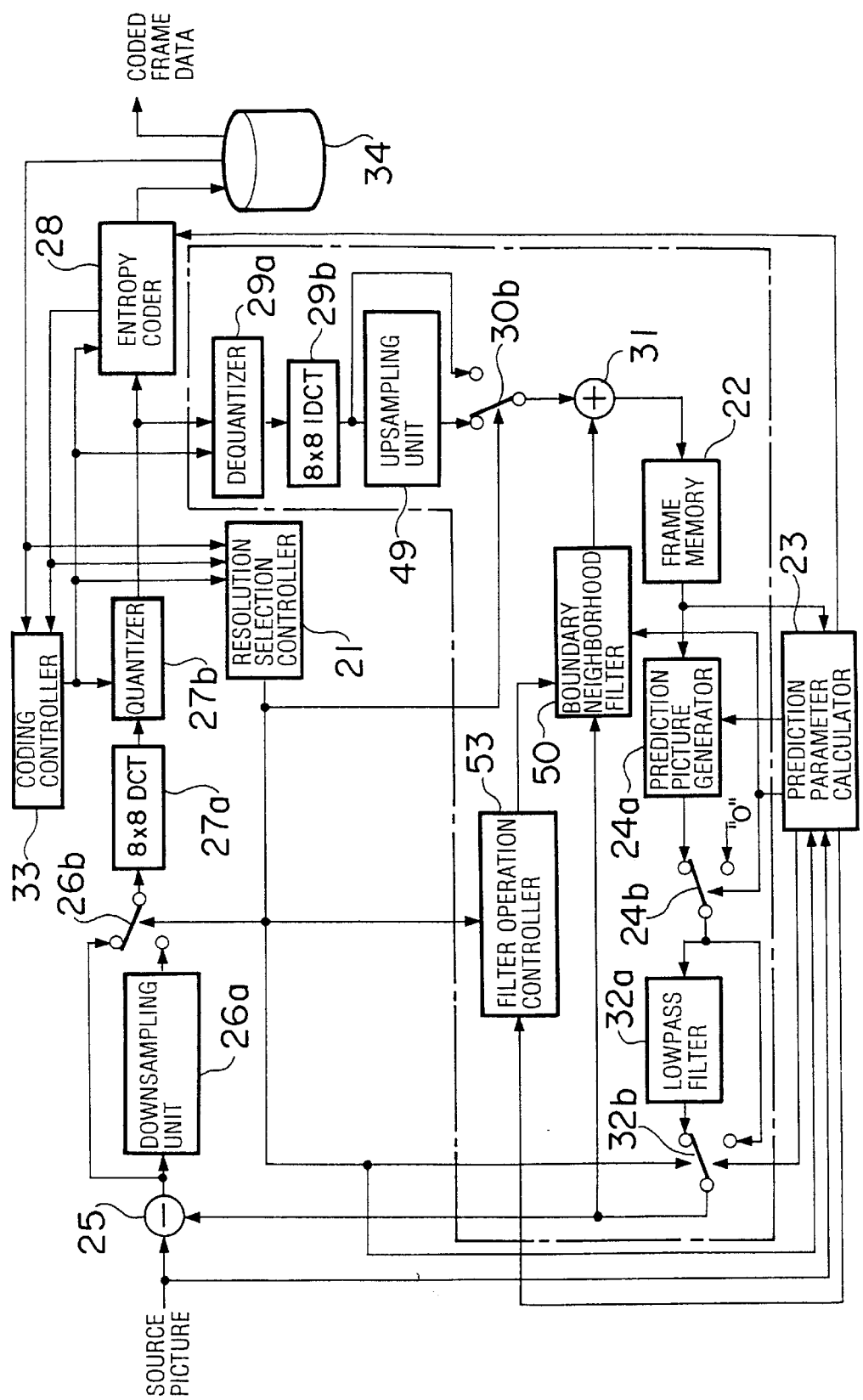
FIG. 8 is a block diagram showing the structure of a fifth embodiment of the present invention.

FIG. 8 is a block diagram showing a detailed structure of the fifth embodiment of the present invention. Since the fifth embodiment has basically the same structure as that of the first embodiment depicted in FIG. 3, the following description will focus on its distinctive points, while affixing like reference numerals to like elements.

This fifth embodiment is distinguishable from the first embodiment in that an upsampling unit 49 works differently from the upsampling unit 30a of the first embodiment, and also in that a boundary neighborhood filter 50 is newly inserted between the lowpass filter switch 32b and decoded picture generation unit 31 of the first embodiment. Further, the fifth embodiment is distinguishable in that it comprises a filter operation controller 53 coupled to the boundary neighborhood filter 50. Unlike the upsampling unit 30a in the first embodiment, the upsampling unit 49 does not examine whether or not each block is adjacent to any other blocks being subject to a different coding scheme. Rather, it executes the conventional upsampling process as illustrated in FIG. 16, referring to any relevant pixels not only within the block but also beyond the block boundary.

Figure 9:
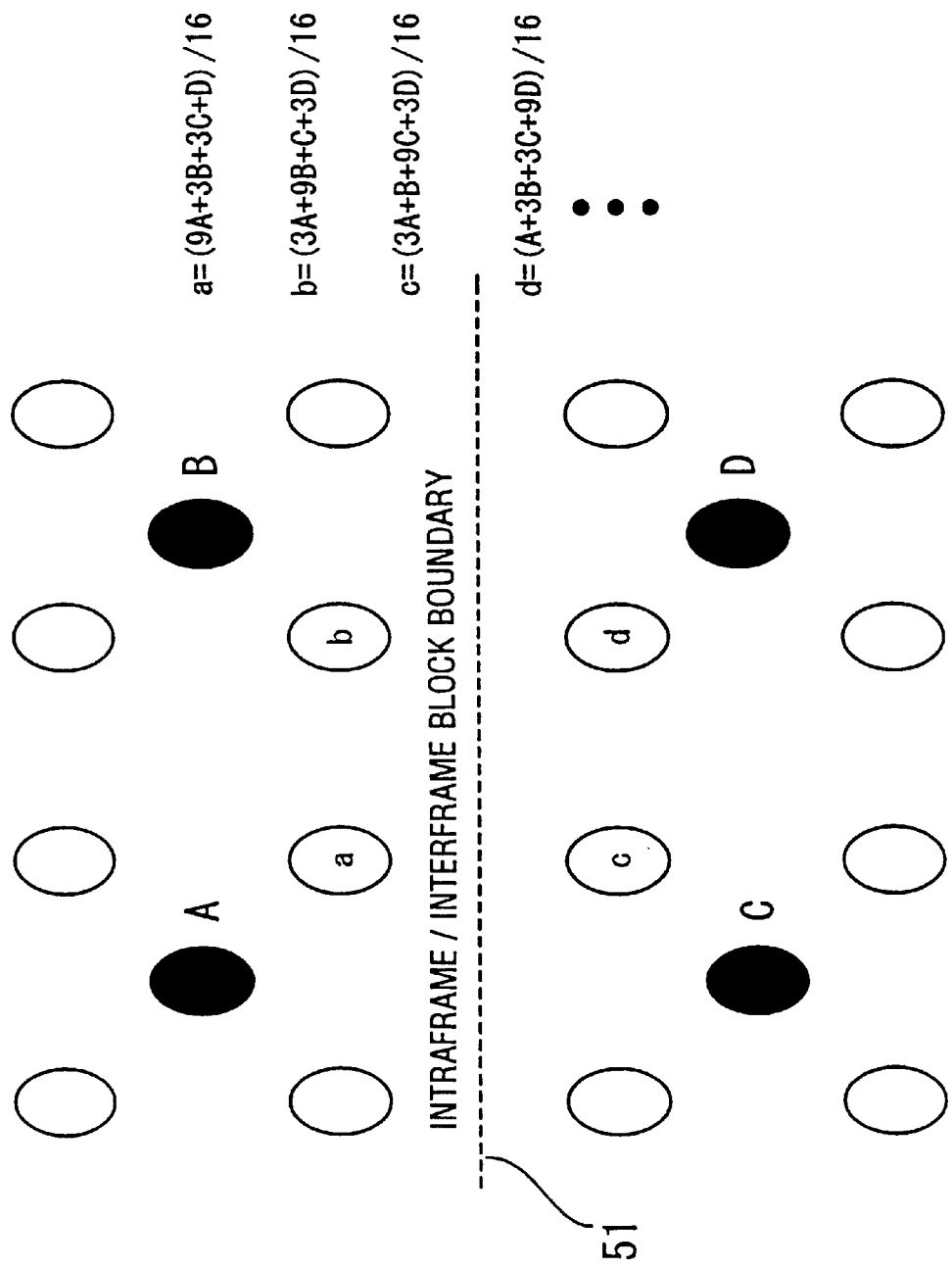
FIG. 9 is a diagram to explain an upsampling process executed by an upsampling unit in the fifth embodiment.

FIG. 9 shows an upsampling process performed by the upsampling unit 49. In FIG. 9, black dots and upper-case alphabetical letters represent QCIF pixels and their respective prediction error signal values, while white dots and lower-case letters represent CIF pixels and their respective prediction error signal values. A dashed line 51 indicates a block boundary where the coding scheme is changed from inter-frame coding to intra-frame coding or vise versa. To obtain the prediction error signal values a, b, c, and so on of the CIF pixels adjacent to the block boundary 51, the upsampling unit 49 calculates a weighted average of the values of four QCIF pixels surrounding each CIF pixel, taking their respective distances from the CIF pixel of interest into consideration. For example, the signal value a is obtained as $$a=(9A+3B+3C+D)/16. \tag{8}$$

As such, the upsampling unit 49 refers not only to the QCIF pixels A and B but also to the pixels C and D that are subject to the different coding scheme.

Referring back to FIG. 8, the filter operation controller 53 receives the picture resolution from the resolution selection controller 21 and the coding scheme for each block from the prediction parameter calculator 23. When the output of the downsampling unit 26a is selected by the downsampling switch 26b (i.e., when the prediction error signal is downsampled to have the OCIF resolution), the filter operation controller 53 examines whether or not the block of interest is adjacent to any other blocks being subject to a different coding scheme. If such a neighboring block is found, the filter operation controller 53 will send an operation command signal to activate the boundary neighborhood filter 50.

The boundary neighborhood filter 50 is kept informed of the coding scheme for each frame determined by the prediction parameter calculator 23. Upon receipt of the operation command signal from the filter operation controller 53, the boundary neighborhood filter 50 executes a smoothing operation to eliminate the discontinuity in the pixel values near the block boundary. This smoothed prediction error signal is then supplied to the decoded picture generation unit 31.

Figure 10:
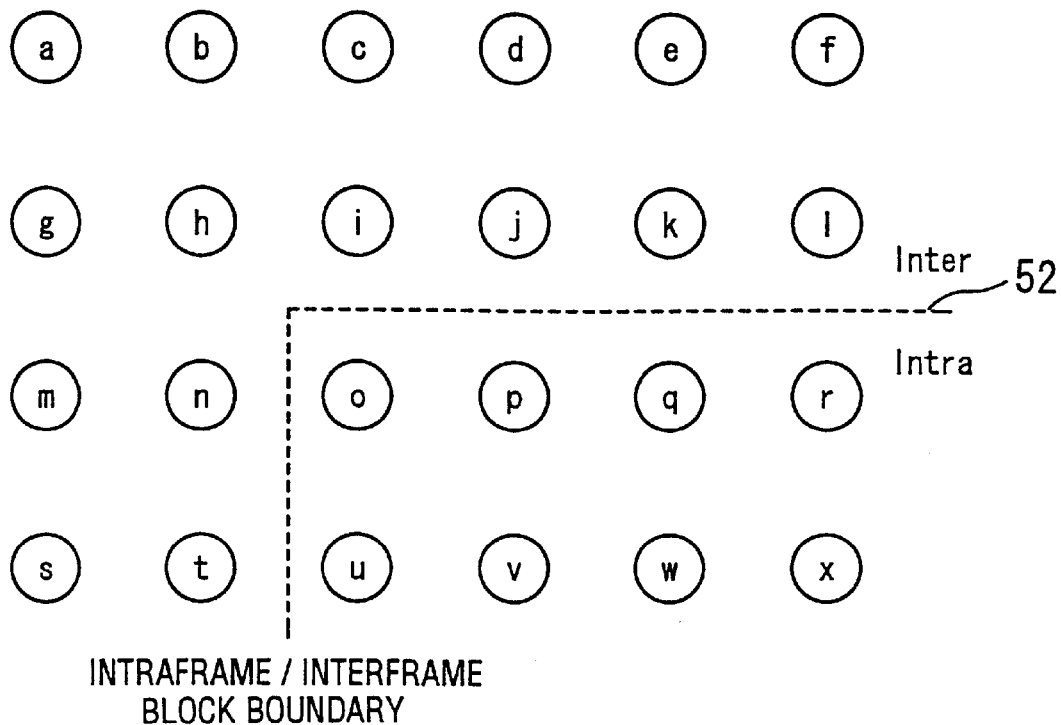
FIG. 10 is a diagram to explain a process performed by a boundary neighborhood filter.

FIG. 10 explains a process executed by the boundary neighborhood filter 50. It is assumed that a prediction picture involving two different coding schemes is supplied to the boundary neighborhood filter 50 via the lowpass filter switch 32b. White dots in FIG. 10 represent some pixels as part of the prediction picture, and lower-case letters affixed to them indicate their respective pixel values. A block boundary 52 is a boundary at which the coding scheme is switched from inter-frame coding to intra-frame coding or vise versa. More specifically, the lower-right block below the block boundary 52 are intraframe-coded, while the other blocks are interframe-coded. In this prediction picture, all the pixel values o, p, q, r, u, v, w, and x of the intraframe-coded block are naturally set to zero. In such a situation, the boundary neighborhood filter 50 applies a smoothing operator to the pixels adjacent to the block boundary 52 so that their values h, i, j, k, l, n, o, p, q, r, t, and u will be continuous. More specifically, the boundary neighborhood filter 50 calculates a new pixel value for each pixel belonging to the interframe-coded block. Take the pixel value j for example. The new value j* for this pixel is calculated as $$j^*=(9c+9d+9i+9j+3e+3f+3k+31)/64. \qquad (9)$$

For another pixel value q, its new pixel value q* will be expressed as $$q^*=(c+d+i+j+3e+3f+3k+31)/64. \qquad (10)$$

When the pixels in the interframe-coded block have large values, the prediction picture will exhibit a large variation or discontinuity in its pixel value profiles, because of zeros are assigned to the intraframe-coded block. The boundary neighborhood filter 50 smoothes such variation and eliminates the discontinuity of pixel values, as further described below with reference to FIG. 11.

FIG. 11 is a diagram to explain a process of predictive coding and decoding of a source picture. FIG. 11 consists of six graphs (a) to (f), which represent the various profiles of pixel values in the neighborhood of a certain block boundary, arranged along the time axis of a coding process.

A source picture (a) contains the following two kinds of blocks: one block subject to intraframe coding (on the left) and another block subject to interframe coding (on the right). Here, the boundary of those different kinds of blocks is indicated by as a vertical dashed line. With respect to the intraframe-coded block, their pixel values in a prediction picture (b) are zeros. Therefore, the resultant prediction error signal (a)–(b), or (c), exhibits large values in the intraframe-coded block and small values in the interframe-coded block.

In such a situation where two adjacent blocks are coded with different schemes (i.e., intraframe and interframe), the upsampling process executed by the upsampling unit 49 of the present embodiment will introduce a mixture of differently coded pixel values in the neighborhood of the block boundary, as in the conventional upsampling process noted earlier. As a result, the profile of the reproduced prediction error signal will be distorted as illustrated in (d).

In the present embodiment, however, the boundary neighborhood filter 50 applies a smoothing operation to the pixels along the block boundary in the original prediction picture (b), and accordingly, a smoothed prediction picture (e) can be obtained. The decoded picture generation means 11 thus renders a fully decoded picture (f) by adding the reproduced prediction error signal (d) to the smoothed prediction picture (e). That is, the video coding apparatus of the fifth embodiment prevents the noises to be introduced in the neighborhood of block boundary in the decoded picture (f), unlike the conventional video coding apparatus which suffer from this kind of noises.

The above-described fifth embodiment is configured so that the filter operation controller 53 will receive the coding scheme of each block from the prediction parameter calculator 23 in addition to the picture resolution from the resolution selection controller 21. As an alternative arrangement, it can be configured so that it will receive the motion vectors, instead of the coding scheme, from the same prediction parameter calculator 23. In that case, the filter operation controller 53 compares the motion vector of a block of interest with those of any adjacent blocks in terms of magnitude of vectors, after detecting that the prediction error signal has been downsampled to the QCIF resolution. If any difference larger than a predetermined threshold is observed, the filter operation controller 53 will send an operation command signal to the boundary neighborhood filter 50.

Upon receipt of the operation command signal from the filter operation controller 53, the boundary neighborhood filter 50 executes a smoothing operation to eliminate the discontinuity in the pixel values along the block boundary. However, the smoothing algorithm used here can not be the same as that described earlier. This is because the above block boundary does not always means a boundary of different coding schemes. That is, since the blocks on one side of the boundary are not always intraframe-coded, the pixels in those blocks may have non-zero values. A proposed smoothing algorithm will now be described below with reference to FIG. 12.

Figure 12:
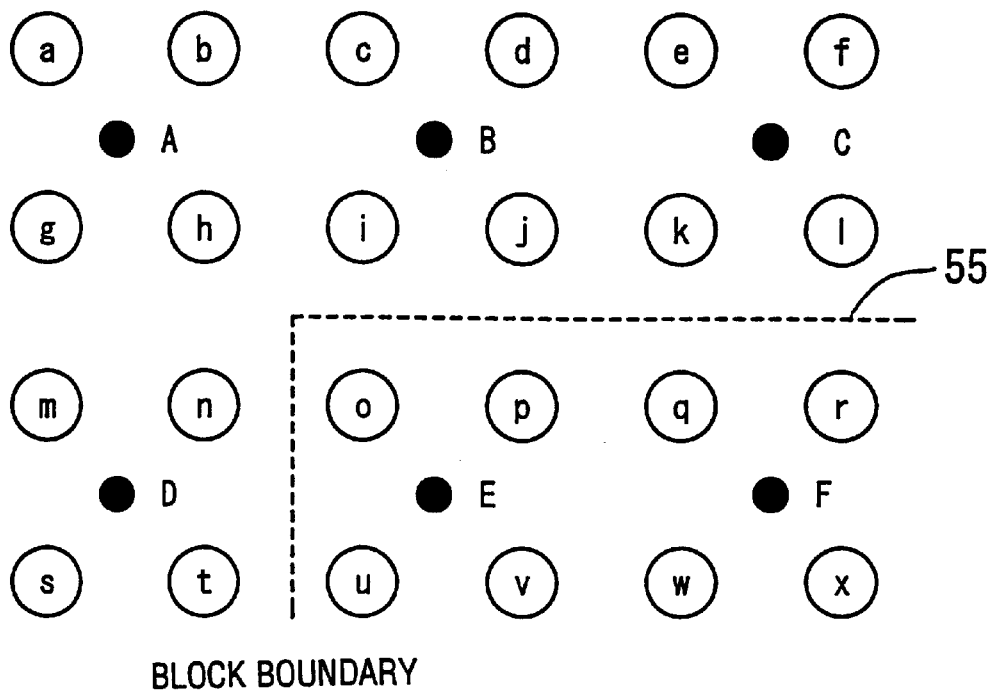
FIG. 12 is a diagram to explain a process performed by the boundary neighborhood filter when an operation command signal is sent thereto due to a critical difference between two adjacent blocks in terms of the magnitude of motion vectors.

FIG. 12 is a diagram to explain a smoothing process performed by the boundary neighborhood filter 50 when an operation command signal is sent thereto. It is assumed that the lowpass filter switch 32b supplied the boundary neighborhood filter 50 with a prediction picture involving some adjacent motion vectors exhibiting a large difference in magnitude which exceeds a predetermined threshold. More specifically, white dots in FIG. 12 represent pixels as part of the prediction picture and lower-case letters affixed to them indicate their respective pixel values. The motion vectors on one side of a block boundary 55 are not equal to those on the other side in terms of vector magnitudes but, rather, the difference is larger than a predetermined threshold.

In such a situation, the boundary neighborhood filter 50 will first calculate average pixel values A, B, C, and D. As represented as black dots in FIG. 12, those average values are corresponding to the values of imaginary pixels located between a first series of pixels [h, i, j, k, l, n, t] immediately adjacent to the block boundary 55 and a second series of pixels [a, b, c, d, e, f, g, m, s] aligned next to the first series of pixels. Likewise, the boundary neighborhood filter 50 further calculates average pixel values E and F, which correspond to the values of black-dot imaginary pixels between a third series of pixels [o, p, q, r, u] immediately adjacent to the block boundary 55 and a fourth series of pixels [v, w, x] aligned next to the third series of pixels. For instance, the average pixel values A and B are calculated as $$A=(a+b+g+h)/4 \qquad (11)$$

$$B=(c+d+i+j)/4. \qquad (12)$$

After that, the boundary neighborhood filter 50 calculates the values of the first series and the third series of pixels, referring to the average pixel values A, B, C, D, E, and F. For example, new pixel values h*, j*, and q* for the present pixel values h, j, and q will be obtained as follows.

$$h^* = (9A+3B+3D+E)/16 \quad (13)$$

$$j^* = (9B+3C+3E+F)/16 \quad (14)$$

$$q^* = (B+3C+3E+9F)/16 \quad (15)$$

In this way, the boundary neighborhood filter 50 smoothes down the variation in pixel values, when it was steep in the neighborhood of a block boundary.

The fifth embodiment may allow the following modified arrangement. That is, the filter operation controller 53 is eliminated and, instead, the boundary neighborhood filter 50 is informed of the picture resolution directly from the resolution selection controller 21. When the prediction error signal was downsampled to the QCIF resolution, the boundary neighborhood filter 50 will always apply the above-described smoothing operation to the pixels in the neighborhood of every block boundary, regardless of whether any critical difference in pixel values is present or not.

This alternative configuration provides an advantage in terms of simplicity of the system, thus allowing the processing time to be reduced. More specifically, the block-to-block difference analysis with respect to the pixel values at a block boundary actually requires a fixed amount of time, because the filter operation controller 53 cannot start the analysis until the information on coding schemes or motion vectors of relevant blocks becomes ready for examination. The above alternative will eliminate such a time-consuming analysis and thus allows the total processing time to be reduced.

Next, the sixth embodiment of the present invention will be described below. This sixth embodiment is related to a video decoding apparatus.

Figure 13:
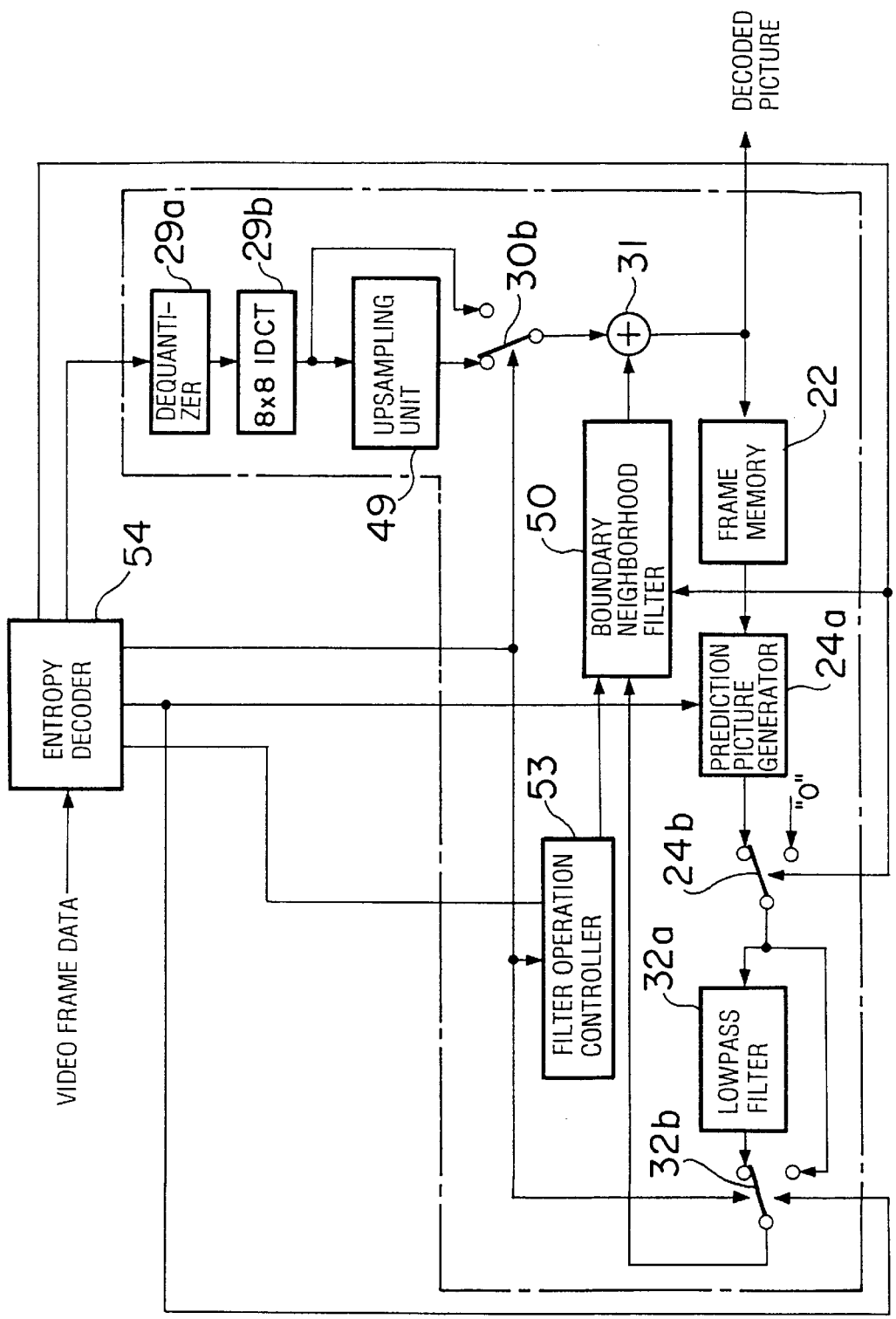
FIG. 13 is a block diagram showing the structure of a sixth embodiment of the present invention.
Figure 14:
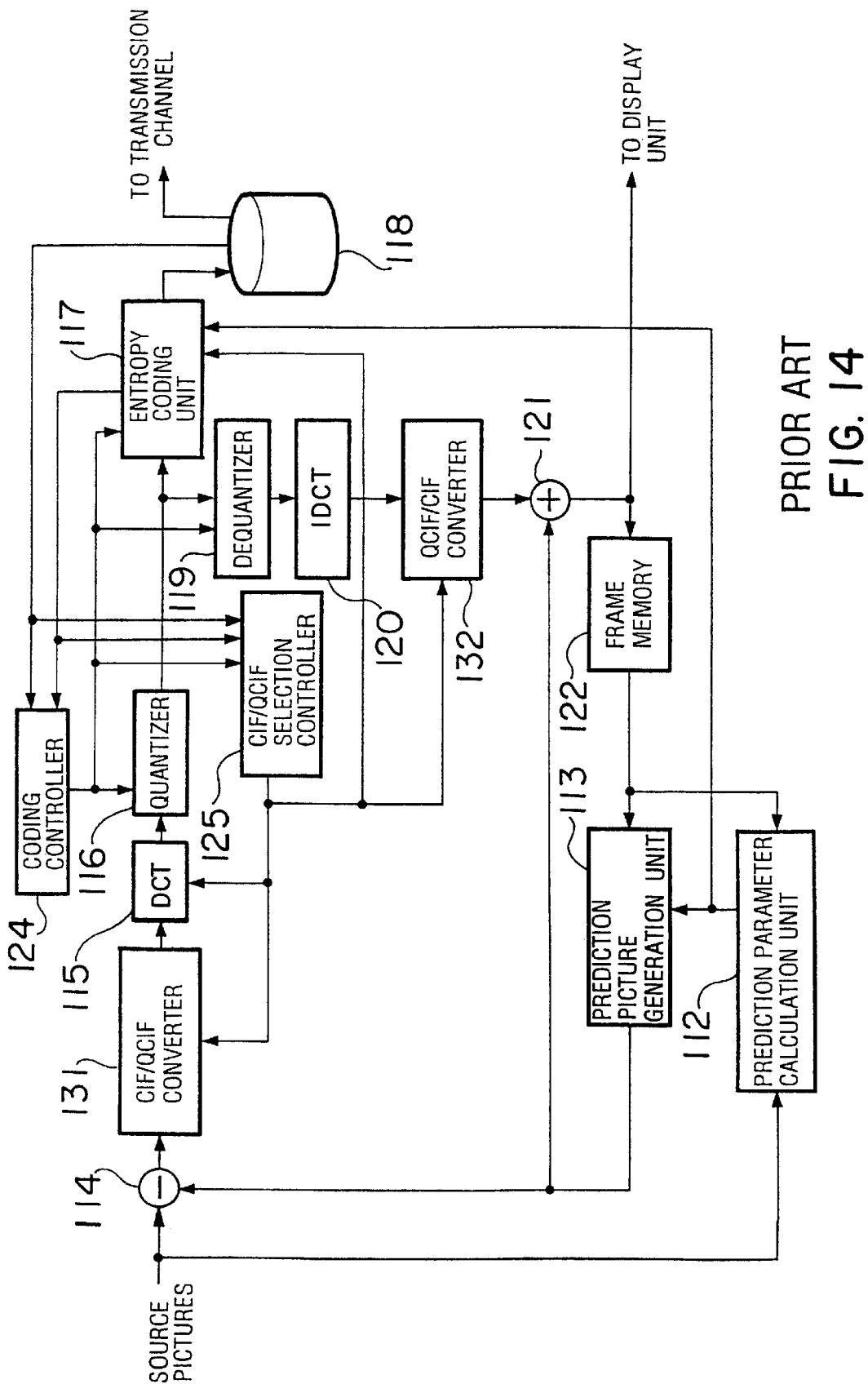
FIG. 14 is a block diagram showing a conventional video coding apparatus.

FIG. 13 shows a specific structure of the sixth embodiment. Since the sixth embodiment employs some elements common to the fifth embodiment, the following description will not repeat the explanation for such elements while affixing like reference numerals to like elements.

Referring to FIG. 13, an entropy decoder 54 reproduces quantized coefficients, picture resolution, quantizer step size, coding scheme, and motion vectors as originally produced, by processing the coded frame data received from a sending end. The entropy decoder 54 distributes those reproduced signals to other functional blocks in the apparatus. More specifically, the quantized coefficients and quantizer step size are sent to the dequantizer 29a; the picture resolution is delivered to the upsampling switch 30b, low-pass filter switch 32b, and filter operation controller 53; the coding scheme is supplied to the prediction picture switch 24b, boundary neighborhood filter 50, and filter operation controller 53; the motion vectors are provided to the prediction picture generator 24a and lowpass filter switch 32b. Note that it is also possible to configure this system in such a way that the filter operation controller 53 will receive motion vectors instead of the coding schemes. Operations of those functional blocks within the area indicated by the alternating long and short dashes will not be described here, because they are common to the fifth embodiment described earlier.

The prediction error signal reproduced by the entropy decoder 54 may have originally been converted down to the QCIF resolution at the sending end. Also, the reproduced prediction picture may contain some adjacent blocks that exhibit critical differences in pixel values. Upon detection of those events and conditions, the filter operation controller 53 issues an operation command signal to the boundary neighborhood filter 50. Such critical differences in pixel values are implied by any block-to-block difference in coding schemes applied or, alternatively, by considerable discontinuous variations observed in the motion vector domain. Upon receipt of the operation command signal from the filter operation controller 53, the boundary neighborhood filter 50 executes a smoothing operation to eliminate the discontinuity in the pixel values near the block boundary concerned.

The output of this video decoding apparatus is obtained at the decoded picture generation unit 31. The video frame signals fully reconstructed by the decoded picture generation unit 31 are outputted to a video monitor or other like devices, while being saved in the frame memory 22 as the reference frames for predictive coding.

In the way described above, the video decoding apparatus of the sixth embodiment receives and decodes the coded video signal produced by a video coding apparatus. The decoding process involves functions of the boundary neighborhood filter 50 and the filter operation controller 53, which were introduced in the fifth embodiment of the present invention. Those two elements allow the pictures to be reproduced without introducing noises, even if the pixel values exhibit some discontinuity at a certain block boundary.

The above discussion will be summarized as follows. According to the present invention, the second resolution conversion means performs an upsampling process to restore the original resolution. In this process, the second resolution conversion means calculates the value of each pixel in a particular block, without referring to pixels belonging to any adjacent block that is subject to another coding scheme. As an alternate arrangement, the upsampling process will totally neglect the pixels in other blocks but only refer to the present block.

By virtue of such upsampling algorithms, the present invention prevents the difference in coding schemes from affecting the reproduced prediction error signal, as opposed to the conventional upsampling process which causes some unwanted noises in the reproduced signal. As a result, the reproduced prediction error signal will exhibit a near-original signal profile. Therefore, the present invention can reproduce the original pictures without introducing unwanted noises, even if some mixed coding schemes are used for compressing a frame, or in other words, even if the pixel values exhibit a critical difference at a certain block boundary.

Further, according to the present invention, the low-pass filter is selectively activated only when a low-resolution coding is conducted and the prediction picture contains some fast-motion blocks. This structural arrangement will prevent the sharpness of images in less-active blocks (background images, for example) as part a picture from being spoiled.

Furthermore, the present invention applies a smoothing operation to the neighborhood of a critical block boundary where the pixel values exhibit a considerable variation, or a large discontinuity, due to the mixed use of different coding schemes at some adjacent blocks or intensive differences in the magnitude of motion vectors at a block boundary. The smoothing operation allows pictures to be reproduced without noises, even if the pixel values in a frame exhibit some discontinuity at a certain block boundary.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video coding apparatus for performing a predictive coding of digital video input signals, comprising:

resolution determination means for selecting a picture resolution to be used in coding a source picture, the picture resolution being either a low resolution or a high resolution;

coding means for coding a prediction error signal representing differences between the source picture and a prediction picture, the prediction error signal having been calculated in the picture resolution selected by said resolution determination means;

decoding means for reproducing the prediction error signal by decoding the coded prediction error signal;

resolution conversion means for converting the reproduced prediction error signal up to the high resolution, if the reproduced prediction error signal provided by said decoding means is of the low resolution;

decoded picture generation means for constructing a decoded picture from the prediction picture and the reproduced prediction error signal converted to the high resolution by said resolution conversion means;

decoded picture storage means for storing the decoded picture constructed by said decoded picture generation means; and prediction picture generation means for producing the prediction picture from the source picture and the decoded picture stored in said decoded picture storage means.

2. A video coding apparatus for performing a predictive coding of digital video input signals, comprising:

resolution determination means for selecting a picture resolution to be used in coding a source picture, the picture resolution being either a low resolution or a high resolution;

prediction error signal generation means for producing a prediction error signal representing differences between the source picture and a prediction picture;

first resolution conversion means for converting the prediction error signal produced by said prediction error signal generation means to the picture resolution selected by said resolution determination means;

coding means for coding the prediction error signal converted by said first resolution conversion means;

decoding means for reproducing the prediction error signal by decoding the coded prediction error signal;

second resolution conversion means for converting the reproduced prediction error signal up to the high resolution, if the reproduced prediction error signal provided by said decoding means is of the low resolution;

decoded picture generation means for constructing a decoded picture from the prediction picture and the reproduced prediction error signal converted to the high resolution by said resolution conversion means;

decoded picture storage means for storing the decoded picture constructed by said decoded picture generation means; and prediction picture generation means for producing the prediction picture from the source picture and the decoded picture stored in said decoded picture storage means.

3. The video coding apparatus according to claim 2, wherein:

the source picture is divided into a plurality of blocks; and said coding means codes the prediction error signal on an individual block basis which is supplied through said first resolution conversion means.

4. The video coding apparatus according to claim 3, wherein said second resolution conversion means converts the reproduced prediction error signal of one of the blocks up to the high resolution, referring to adjacent blocks thereof, except for such adjacent blocks that are different from the block of interest in terms of coding schemes, if the prediction error signal of the block of interest has been converted down to the low resolution by said first resolution conversion means.

5. The video coding apparatus according to claim 3, wherein said second resolution conversion means converts the reproduced prediction error signal of one of the blocks up to the high resolution, referring only to the reproduced prediction error signal of pixels within the block of interest, if the prediction error signal of the block of interest has been converted down to the low resolution by said first resolution conversion means.

6. A video coding apparatus for performing a predictive coding of digital video input signals, comprising:

a resolution determination unit selecting a picture resolution to be used in coding a source picture, the picture resolution being either a low resolution or a high resolution;

a coding unit coding a prediction error signal representing differences between the source picture and a prediction picture, the prediction error signal having been calculated in the picture resolution selected by said resolution determination unit;

a decoding unit reproducing the prediction error signal by decoding the coded prediction error signal;

a resolution conversion unit converting the reproduced prediction error signal up to the high resolution, if the reproduced prediction error signal provided by said decoding unit is of the low resolution;

a decoded picture generation unit constructing a decoded picture from the prediction picture and the reproduced prediction error signal converted to the high resolution by said resolution conversion unit;

a decoded picture storage unit storing the decoded picture constructed by said decoded picture generation unit; and a prediction picture generation unit producing the prediction picture from the source picture and the decoded picture stored in said decoded picture storage unit.

7. A video coding apparatus for performing a predictive coding of digital video input signals, comprising:

a resolution determination unit selecting a picture resolution to be used in coding a source picture, the picture resolution being either a low resolution or a high resolution;

a prediction error signal generation unit producing a prediction error signal representing differences between the source picture and a prediction picture;

a first resolution conversion unit converting the prediction error signal produced by said prediction error signal generation unit to the picture resolution selected by said resolution determination unit;

a coding unit coding the prediction error signal converted by said first resolution conversion unit;

a decoding unit reproducing the prediction error signal by decoding the coded prediction error signal;

a second resolution conversion unit converting the reproduced prediction error signal up to the high resolution, if the reproduced prediction error signal provided by said decoding unit is of the low resolution;

a decoded picture generation unit constructing a decoded picture from the prediction picture and the reproduced prediction error signal converted to the high resolution by said resolution conversion unit;

a decoded picture storage unit storing the decoded picture constructed by said decoded picture generation unit; and a prediction picture generation unit producing the prediction picture from the source picture and the decoded picture stored in said decoded picture storage unit.

8. A video coding method for performing a predictive coding of digital video input signals, comprising:

selecting a picture resolution to be used in coding a source picture, the picture resolution being either a low resolution or a high resolution;

coding a prediction error signal representing differences between the source picture and a prediction picture, the prediction error signal having been calculated in the picture resolution selected by said selecting a picture resolution;

reproducing the prediction error signal by decoding the coded prediction error signal;

converting the reproduced prediction error signal up to the high resolution, if the reproduced prediction error signal is of the low resolution;

constructing a decoded picture from the prediction picture and the reproduced prediction error signal converted to the high resolution by said resolution;

storing the decoded picture; and producing the prediction picture from the source picture and the stored decoded picture.

9. A video coding method for performing a predictive coding of digital video input signals, comprising:

selecting a picture resolution to be used in coding a source picture, the picture resolution being either a low resolution or a high resolution;

producing a prediction error signal representing differences between the source picture and a prediction picture;

converting the prediction error signal to the selected picture resolution;

coding the converted prediction error signal;

reproducing the prediction error signal by decoding the coded prediction error signal;

converting the reproduced prediction error signal up to the high resolution, if the reproduced prediction error signal is of the low resolution;

constructing a decoded picture from the prediction picture and the reproduced prediction error signal converted to the high resolution;

storing the decoded picture; and producing the prediction picture from the source picture and the stored decoded picture.

\* \* \* \* \*